(12) United States Patent
Gysling et al.

(10) Patent No.: US 7,322,251 B2
(45) Date of Patent: Jan. 29, 2008

(54) METHOD AND APPARATUS FOR MEASURING A PARAMETER OF A HIGH TEMPERATURE FLUID FLOWING WITHIN A PIPE USING AN ARRAY OF PIEZOELECTRIC BASED FLOW SENSORS

(75) Inventors: Daniel L. Gysling, Glastonbury, CT (US); Michael A. Davis, Glastonbury, CT (US); James R. Dunphy, South Glastonbury, CT (US); Paul F. Croteau, Columbia, CT (US); Robert J. Maron, Middletown, CT (US)

(73) Assignee: CIDRA Corporation, Wallingford, CT (US)

( * ) Notice: Subject to any disclaimer, the term of this patent is extended or adjusted under 35 U.S.C. 154(b) by 86 days.

(21) Appl. No.: 10/909,612

(22) Filed: Aug. 2, 2004

(65) Prior Publication Data
US 2005/0044966 A1 Mar. 3, 2005

Related U.S. Application Data

(60) Provisional application No. 60/491,871, filed on Aug. 1, 2003.

(51) Int. Cl.
*G01F 1/66* (2006.01)
(52) U.S. Cl. .................................... 73/861.26
(58) Field of Classification Search ............. 73/861.26, 73/861.25, 861.06, 861.27, 861.24; 367/155
See application file for complete search history.

(56) References Cited

U.S. PATENT DOCUMENTS 4,048,853 A 9/1977 Smith et al. .............. 73/861.25
4,080,837 A 3/1978 Alexander et al. ......... 73/61.45

(Continued)

FOREIGN PATENT DOCUMENTS

FR 2725787 4/1996

(Continued)

OTHER PUBLICATIONS

"PVDF and Array Transducers" Author: Robert A. Day—NDTnet—Sep. 1996—vol. No. 9.

(Continued)

*Primary Examiner*—Jewel Thompson
(74) *Attorney, Agent, or Firm*—Michael Grillo

(57) ABSTRACT

A method, apparatus and system are provided to measure the process flow of a fluid or medium traveling in a pipe. The system and apparatus feature a standoff and piezoelectric-based sensor arrangement having a plurality of standoffs arranged on a pipe and a plurality of sensor bands, each arranged on a respective plurality of standoffs, each having at least one sensor made of piezoelectric material arranged thereon to detect unsteady pressure disturbances in the process flow in the pipe which in turn can be converted to the velocity of and/or speed of sound propagating within the pipe, and a cooling tube arranged in relation to the plurality of standoffs for actively cooling the sensor band; and further comprise a processing module for converting one or more sensor signals into a measurement containing information about the flow of the fluid or medium traveling in the pipe, as well as a pump and heat exchanger for processing the cooling fluid flowing through the cooling tube. The processing includes maintaining the cooling fluid at a desired operating temperature.

62 Claims, 16 Drawing Sheets

U.S. PATENT DOCUMENTS

| | | | |
|---|---|---|---|
| 4,090,404 A | 5/1978 | Dupont et al. | 73/119 |
| 4,248,085 A | 2/1981 | Coulthard | 73/861.06 |
| 4,445,389 A | 5/1984 | Potzick et al. | 73/861.27 |
| 4,546,459 A * | 10/1985 | Congdon | 367/155 |
| 4,653,036 A | 3/1987 | Harris et al. | 361/170 |
| 4,810,913 A | 3/1989 | Beauducel et al. | 310/337 |
| 4,883,271 A | 11/1989 | French | |
| 4,896,540 A | 1/1990 | Shakkottai et al. | 73/861.02 |
| 5,040,415 A | 8/1991 | Barkhoudarian | 73/861.03 |
| 5,083,452 A | 1/1992 | Hope | 73/61 R |
| 5,192,051 A * | 3/1993 | Roberson | 251/328 |
| 5,209,125 A * | 5/1993 | Kalinoski et al. | 73/861.24 |
| 5,218,197 A | 6/1993 | Carroll | 250/227.19 |
| 5,285,675 A | 2/1994 | Colgate et al. | 73/23.2 |
| 5,357,486 A * | 10/1994 | Pearce | 367/159 |
| 5,367,911 A | 11/1994 | Jewell et al. | 73/861.08 |
| 5,398,542 A | 3/1995 | Vasbinder | 73/40.5 |
| 5,524,475 A * | 6/1996 | Kolpak et al. | 73/19.03 |
| 5,526,844 A | 6/1996 | Kamen et al. | 137/614.11 |
| 5,550,791 A | 8/1996 | Peloquin | |
| 5,591,922 A | 1/1997 | Segeral et al. | 73/861.04 |
| 5,741,980 A * | 4/1998 | Hill et al. | 73/861.04 |
| 5,770,805 A | 6/1998 | Castel | 73/861.04 |
| 5,770,806 A | 6/1998 | Hiismaki | 73/861.29 |
| 5,835,884 A | 11/1998 | Brown | 73/861.04 |
| 5,845,033 A | 12/1998 | Berthold et al. | 385/12 |
| 5,948,959 A | 9/1999 | Peloquin | 73/1.83 |
| 6,151,958 A | 11/2000 | Letton et al. | 73/61.79 |
| 6,202,494 B1 | 3/2001 | Ricbel et al. | 73/861.29 |
| 6,354,147 B1 | 3/2002 | Gysling et al. | 73/61.79 |
| 6,378,357 B1 | 4/2002 | Han et al. | 73/54.41 |
| 6,435,030 B1 | 8/2002 | Gysling et al. | 73/587 |
| 6,450,037 B1 | 9/2002 | McGuinn et al. | |
| 6,463,813 B1 | 10/2002 | Gysling | 73/862.59 |
| 6,536,291 B1 | 3/2003 | Gysling et al. | 73/861.42 |
| 6,550,342 B2 | 4/2003 | Croteau et al. | 73/800 |
| 6,584,708 B2 * | 7/2003 | Yun et al. | 310/324 |
| 6,587,798 B2 | 7/2003 | Kersey et al. | 702/50 |
| 6,601,458 B1 | 8/2003 | Gysling et al. | 73/861.04 |
| 6,609,069 B2 | 8/2003 | Gysling | 702/48 |
| 6,691,584 B2 * | 2/2004 | Gysling et al. | 73/861.42 |
| 6,732,575 B2 | 5/2004 | Gysling et al. | 73/61.79 |
| 6,782,150 B2 | 8/2004 | Davis et al. | 385/12 |
| 6,813,962 B2 | 11/2004 | Gysling et al. | 73/861.26 |
| 6,837,098 B2 | 1/2005 | Gysling et al. | 73/61.79 |
| 6,868,737 B2 | 3/2005 | Croteau et al. | |
| 6,889,562 B2 | 5/2005 | Gysling et al. | |
| 6,898,541 B2 | 5/2005 | Gysling et al. | |
| 7,032,432 B2 | 4/2006 | Gysling et al. | |
| 2002/0123852 A1 | 9/2002 | Gysling et al. | |
| 2002/0129662 A1 | 9/2002 | Gysling et al. | |
| 2002/0194932 A1 | 12/2002 | Winston et al. | |
| 2003/0136186 A1 | 7/2003 | Gysling et al. | |
| 2003/0154036 A1 | 8/2003 | Gysling et al. | |
| 2004/0168522 A1 | 9/2004 | Bailey et al. | |
| 2004/0168523 A1 | 9/2004 | Bailey et al. | |
| 2004/0199341 A1 | 10/2004 | Gysling et al. | |
| 2004/0210404 A1 | 10/2004 | Gysling et al. | |
| 2004/0226386 A1 | 11/2004 | Croteau et al. | |
| 2004/0231431 A1 | 11/2004 | Bailey et al. | |
| 2004/0255695 A1 | 12/2004 | Gysling et al. | |
| 2005/0011284 A1 | 1/2005 | Davis et al. | |
| 2005/0050956 A1 | 3/2005 | Croteau et al. | |

FOREIGN PATENT DOCUMENTS

| | | |
|---|---|---|
| GB | 2282931 | 4/1993 |
| JP | 11230801 | 8/1999 |
| WO | WO 93/14382 | 7/1993 |
| WO | WO 99/67629 | 12/1999 |
| WO | WO 03/062759 | 7/2003 |
| WO | WO 2004/065912 | 8/2004 |

OTHER PUBLICATIONS

"Polymer Piezoelectric Transducers for Ultrasonic NDE" Aughors: Yoseph Bar-Cohen, Tianji Xue and Shyh-Shiuh Lih.

"Piezoelectric Polymers" ICASE Report No. 2001-43—Dec. 2001.

"Piezo Film Sensors Technical Manual" P/N 1005663-1 Rev. B Apr. 2, 1999.

"Noise and Vibration Control Engineering Principles and Applications", Leo L. Beranek and Istvan L. Ver, A. Wiley Interscience Publication, pp. 537-541, Aug. 1992.

"Two Decades of Array Signal Processing Research", The Parametric Approach, H. Krim and M. Viberg, IEEE Signal Processing Magazine, Jul. 1996, pp. 67-94.

"Development of an array of pressure sensors with PVDF film, Experiments in Fluids 26", Jan. 8, 1999, Springer-Verlag.

"Viscous Attentuation of Acoustic Waves in Suspensions" by R.L. Gibson, Jr. and M.N. Toksoz.

\* cited by examiner

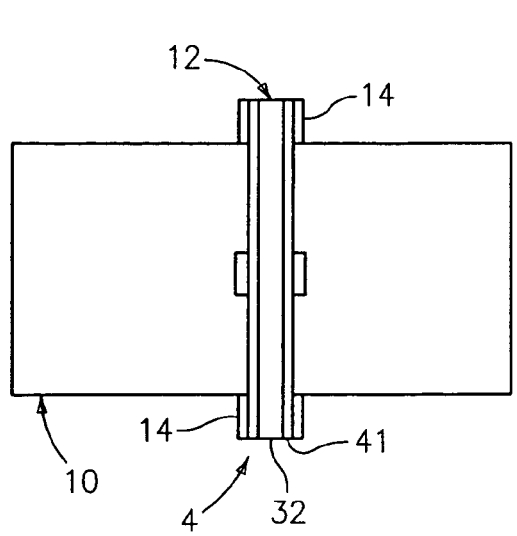
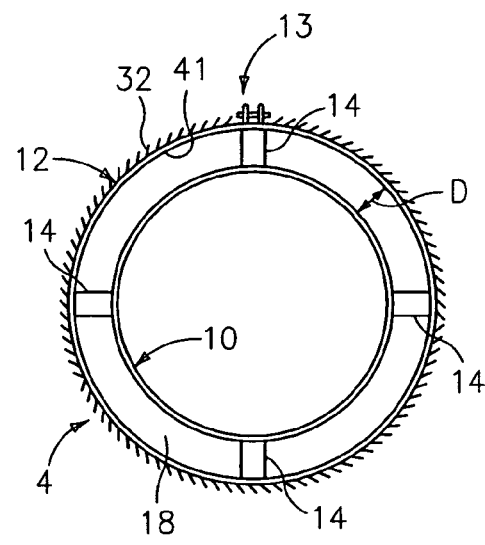
FIG. 2a          FIG. 2b
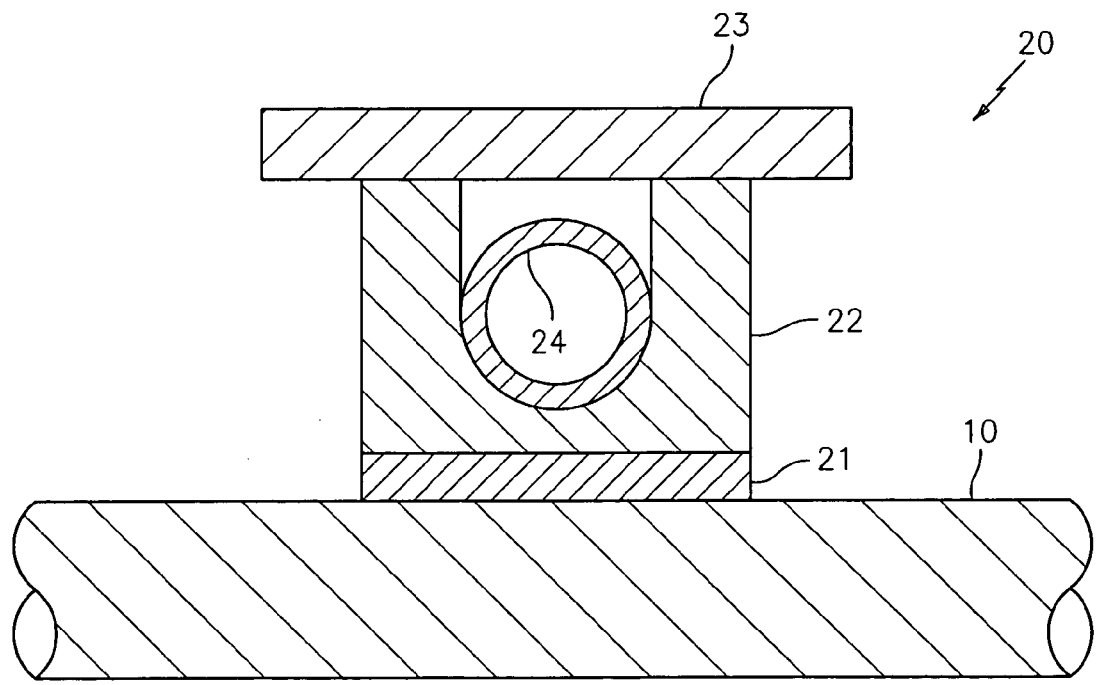
FIG. 5

METHOD AND APPARATUS FOR MEASURING A PARAMETER OF A HIGH TEMPERATURE FLUID FLOWING WITHIN A PIPE USING AN ARRAY OF PIEZOELECTRIC BASED FLOW SENSORS

CROSS-REFERENCE TO RELATED APPLICATIONS

The present application claims the benefit of U.S. Provisional Patent Application No. 60/491,871, filed Aug. 1, 2003, which is incorporated by reference herein in its entirety.

BACKGROUND OF THE INVENTION

1. Technical Field

The present invention relates to a system for measuring dynamic, unsteady pressures within a fluid or medium, including a fluid or medium having an extremely high temperature such as steam, flowing inside a pipe and using it to determine a parameter (e.g., flow velocity and/or speed of sound) of the fluid or medium; and more particularly to a system for measuring the same using a piezoelectric-based sensor device or the like.

2. Description of Related Art

Techniques are known that enable flow and fluid parameter measurements which utilize an array of strain-based sensors, clamped onto the outside of a process piping. Depending on the specifics of the application, it is often desirable to use a strain sensor design to measure the circumferentially averaged strain within a pipe. One method to achieve circumferentially averaged strain within a conduit utilizes strain sensitive piezoelectric strips or bands. Although the flow monitoring systems designed with piezoelectric material as the sensing element have proven to be effective, application of such a system is often severely limited by the maximum operating temperature for the piezoelectric material, which limits applications for use in relation to pipes having an extremely high temperature fluid or medium such as steam.

For example, PVDF sensors used for a known flow meter product are limited to relatively low-to-medium temperature applications, with the current upper temperature limit or rating of about 125° C. This limit is derived from the material operating limits, due to the requirement that the sensors be in contact with the pipe to measure the pipe strain caused by pressure variations in the fluid traveling through the pipe. In the chemical industry in particular, the 125° C. temperature limit is quite restrictive as many processes will run over this limit. It is believed that with some development, higher temperatures on the order of 150° C. may be possible, but even with such temperatures, the maximum operating temperature of PVDF-based sensing materials is far short of a significant amount of the process temperatures for a significant amount of flow metering applications that are needed.

SUMMARY OF THE INVENTION

In its broadest sense, the present invention provides a new and unique method and system to measure a parameter of the process flow of a fluid or medium traveling in a pipe using one or more sensors, wherein the one or more sensors are made of peizoelectric material, arranged on one or more standoffs, which may be actively cooled.

In operation, the one or more sensors respond to variations in a sensed parameter caused by the fluid or medium flowing in the pipe, and provide one or more sensor signals containing information about the same. The system also includes a processing module for converting the one or more sensor signals into a measurement containing information about the flow velocity of and/or speed of sound through the fluid or medium traveling in the pipe based on analysis of unsteady pressures associated with turbulent disturbances and/or acoustic waves.

In one embodiment, a standoff(s) provides a thermal barrier arranged between the one or more sensors and the pipe. The thermal barrier may include a relatively stiff in compression, yet flexible in bending, low thermal conductivity material in direct contact with the pipe wall.

The standoff may also include a standoff ring with a cooling channel through which a cooling fluid flows. The standoff ring may be a relatively stiff in radial compression, but made of a material with a relatively high thermal conductivity, including steel or aluminum. The standoff ring may also be partially segmented into multiple circumferential segments to minimize the increase in hoop stiffness of the combined pipe and standoff configuration. The partial segmentation may take the form of partial radial slots. The standoff ring may include one or more buckles for fastening the standoff onto the pipe.

The standoff may also include a sensor platform in the form of a separate band having the one or more sensors arranged thereon that clamps over the standoff ring. In this case, a plurality of standoffs are circumferentially arranged on and about the pipe for holding each sensor band separated from the pipe wall. Typically, a plurality of sensor bands are arranged along the longitudinal axis of the pipe.

The system may include a pump for providing the cooling fluid that flows through the cooling channel, as well as a heat exchanger for processing the cooling fluid flowing through the cooling channel.

The system may include a cover to minimize temperature changes from external sources from affecting the sensor readings.

In one embodiment, the system includes a plurality of standoffs arranged on a pipe; a plurality of sensor bands, each arranged on a respective plurality of standoffs, each having at least one sensor made of piezoelectric material arranged thereon to detect variation in the sensed parameter, such as pressure, in the pipe which in turn can be converted to the flow velocity and/or speed of sound within the pipe; and a cooling tube arranged in relation to the plurality of standoffs for actively cooling each sensor band. The system would also include the processing module for converting one or more sensor signals into a measurement containing information about the flow of the fluid or medium traveling in the pipe, as well as the heat exchanger for processing the cooling fluid flowing through the cooling tube.

The present invention also includes a method to measure the flow of a fluid or medium traveling in a pipe using one or more sensors, featuring the step of arranging one or more sensors made of piezoelectric material on one or more standoffs and actively cooling the same, consistent with that set forth above.

In one embodiment, variations in the sensed parameter caused by the flow of the fluid or medium as it travels down the pipe are sensed. As this fluid flows it will transmit some of its energy into the pipe itself. The different sections of the pipe will experience, for example, pressure changes along the length of the pipe 10 which vary along the length of the pipe 10. Therefore, the piezoelectric based sensor(s) which are not in direct contact with the pipe, instead being located at a distance from the outer surface of the pipe, will be able to detect the pressure changes in the pipe which in turn can be converted to the flow velocity and/or speed of sound within the pipe using known techniques, such as array processing techniques.

In effect, the present invention provides a new method, apparatus and system to enable the use of temperature limited sensors and/or sensing material (i.e. piezoelectric-based sensors or the like) to measure and monitor flow velocity of and/or speed of sound through a fluid or medium flowing in a pipe at process temperatures significantly higher than the maximum operating temperature of the sensors or sensing material as discussed above, while maintaining the sensors or sensing material at an acceptable operating temperature by using a unique insulative and/or cooling technique. The challenge posed in the design of this invention is to maintain sufficient mechanical coupling and minimize the introduction of extraneous noise in the output of the sensor or sensing material due to the cooling process, while maintaining the sensor or sensing material at the acceptable operating temperature.

The foregoing and other objects, features and advantages of the present invention will become more apparent in light of the following detailed description of exemplary embodiments thereof.

BRIEF DESCRIPTION OF THE DRAWING

The drawing are not drawn to scale and include the following Figures:

FIG. 2*a* is a plan view of a passively cooled piezoelectric-based pressure sensor mounted to a pipe, in accordance with present invention.

FIG. 2*b* is a side view of the passively cooled piezoelectric-based pressure sensor mounted to a pipe of FIG. 2*a*.

FIG. 5 is a cross-sectional view of a fluid cooled standoff mounted to a pipe, in accordance with the present invention.

BEST MODE FOR CARRYING OUT THE INVENTION

Figure 1:
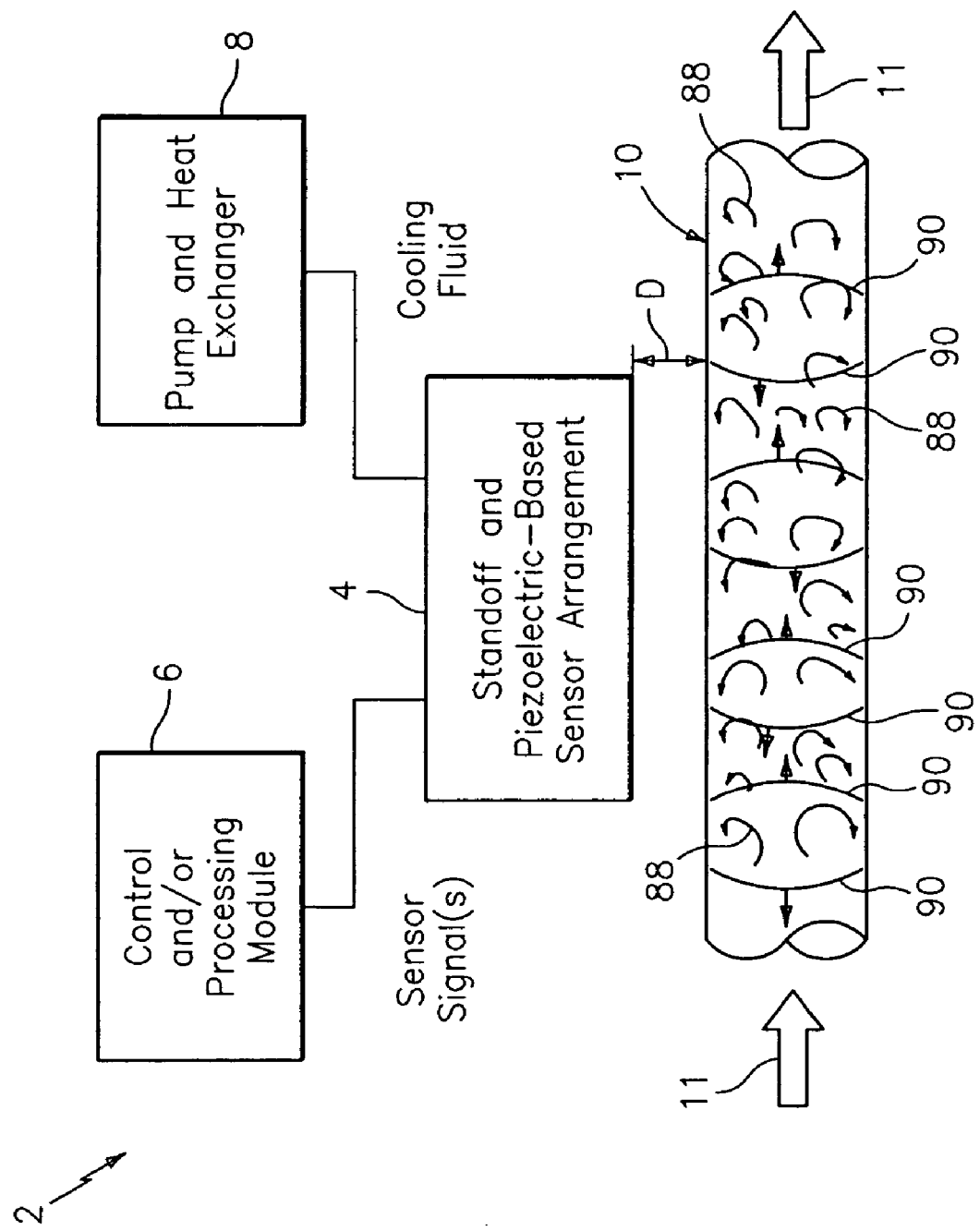
FIG. 1 is a block diagram of an apparatus for measuring a parameter of a high temperature fluid flowing within a pipe, in accordance with the present invention.

FIG. 1 shows a diagram of a system generally indicated as 2 according to the present invention, including a standoff and piezoelectric-based sensor arrangement 4, a control and/or processing module 6 and a pump and heat exchanger 8. The standoff and piezoelectric-based sensor arrangement 4 is arranged in relation to a pipe 10 and includes one or more sensors made of piezoelectric material, such as polyvinylidene fluoride ("PVDF"), that are arranged on one or more standoffs, which may be actively cooled, consistent with that described herein. The pipe 10 carries a process flow of a fluid or medium 11 that can reach very hot temperatures, such as steam.

Although the scope of the invention is not intended to be limited to the type or kind of fluid or medium 11 flowing in the pipe 10 per se, it is specifically designed to measure a parameter of the fluid or medium at very high temperatures, such as steam, using a piezoelectric-based sensor at temperatures substantially exceeding 125° C. The control and/or processing module 6 converts one or more sensor signals into a measurement containing information about a parameter of the fluid or medium traveling in the pipe based on analysis of variations in some sensed parameter such as pressure changes 88 caused by the fluid or medium flowing in the pipe and/or acoustic waves 90 actively or passively created in the flow. The pump and heat exchanger 8 provides cooling fluid that flows through cooling channel(s) shown and described below, as well as processing the cooling fluid flowing through the cooling channel to maintain the one or more piezoelectric-based sensors at a desired operating temperature.

In operation, pressure variations caused by turbulent eddies 88 and/or acoustic waves 90 in the flow of the fluid or medium 11 as it travels down the pipe 10 are sensed. As this fluid or medium flows, the unsteady pressure within the fluid transmits some of its energy into the pipe 10 itself. The different sections of the pipe 10 will experience, for example, pressure changes along the length of the pipe 10 which vary along the length of the pipe 10. Therefore, the piezoelectric-based sensor(s) which are not in direct contact with the pipe 10, instead being located at a distance generally indicated as D from the pipe 10. The sensors can detect the pressure changes in the pipe 10 which in turn can be converted to a parameter of the flow within the pipe 10 using known techniques discussed below. The parameters that can be measured include the velocity of the fluid, the volumetric flow of the fluid, the speed of sound propagating through the fluid, the consistency or composition of the fluid, the density of the fluid, the Mach number of the fluid, the average size of particles flowing through the fluid, the air/mass ratio of the fluid, and/or the percentage of entrained air within the fluid. The flow may be a single phase fluid or multiphase fluid including liquid, gas, aerated liquid, liquid/liquid mixture, solid/liquid mixture, solid/liquid/gas mixture, non-Newtonian fluids and slurries.

The present invention is described in relation to the sensor material being made of a piezoelectric material, such as polyvinylidene fluoride ("PVDF"). However, the scope of the invention is also intended to include using other types of sensor material now known or later developed in the future having a similar piezoelectric effect as that of PVDF material.

The control and/or processing module 6 may be implemented using hardware, software, firmware, or some combination thereof, including performing the analysis of the variations in the sensed parameter to determine the flow parameter consistent with that described herein. In a typical software implementation, the control and/or processing module 6 may be one or more microprocessor-based architectures having a microprocessor, a random access memory (RAM), a read only memory (ROM), input/output devices and control, data and address buses connecting the same. A person skilled in the art of programming would be able to program such a microprocessor-based implementation to perform the functionality described herein without undue experimentation. The scope of the invention is not intended to be limited to any particular implementation using technology known or later developed in the future. Finally, the control and/or processor module 6 may perform control functionality in the system 2, which may also be implemented as a separate module or controller.

FIGS. 2(*a*) and (*b*) show an embodiment of the present invention in which the piezoelectric sensor material is used to detect unsteady pressure along the pipe 10. Here, the standoff and piezoelectric-based sensor arrangement 4 includes PVDF sensors 12 clamped to the pipe 10, but held off the surface by a series of standoffs 14, such as by clamping onto the standoffs at 13.

Figure 3:
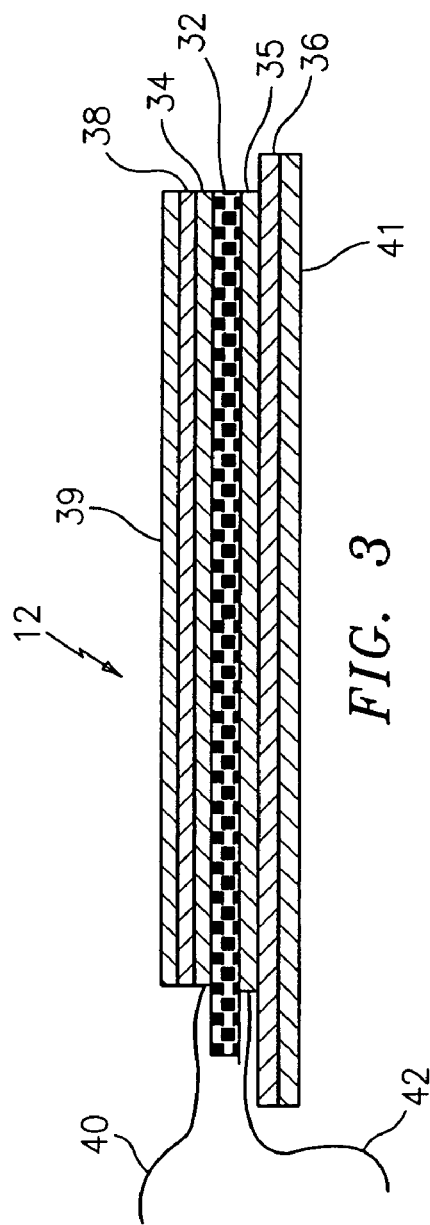
FIG. 3 is a cross-sectional view of a piezoelectric film sensor in accordance with the present invention.
Figure 4:
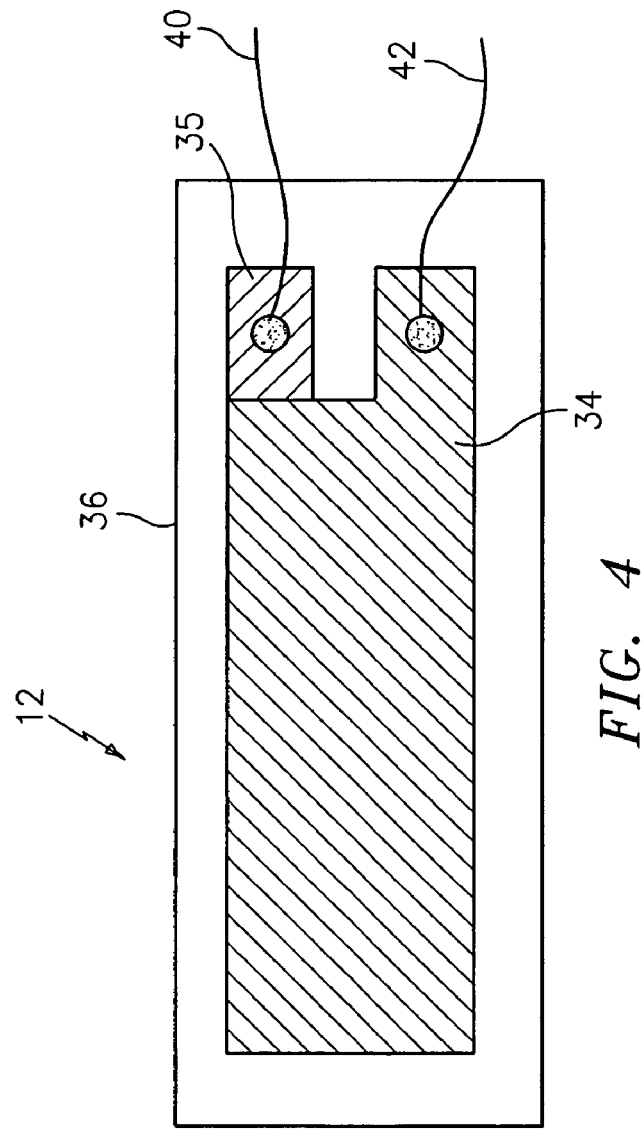
FIG. 4 is a top plan view of a piezoelectric film sensor in accordance with the present invention.

As best shown in FIGS. 3 and 4, the piezoelectric film sensors 30 include a piezoelectric material or film 32 to generate an electrical signal proportional to the degree that the material is mechanically deformed or stressed. The piezoelectric sensing element is typically conformed to allow complete or nearly complete circumferential measurement of induced strain to provide a circumferential-averaged pressure signal. The sensors can be formed from PVDF films, co-polymer films, or flexible PZT sensors, similar to that described in "Piezo Film Sensors Technical Manual" provided by Measurement Specialties, Inc., which is incorporated herein by reference. A piezoelectric film sensor that may be used for the present invention is part number 1-1002405-0, LDT4-028K, manufactured by Measurement Specialties, Inc.

Piezoelectric film ("piezofilm"), like piezoelectric material, is a dynamic material that develops' an electrical charge proportional to a change in mechanical stress. Consequently, the piezoelectric material measures the strain induced within the pipe 10 due to unsteady pressure variations (e.g., vortical and/or acoustical) within the fluid flow 11. Strain within the pipe is transduced to an output voltage or current by the attached piezoelectric sensor. The piezoelectrical material or film may be formed of a polymer, such as polarized fluoropolymer, polyvinylidene fluoride (PVDF).

FIGS. 3 and 4 illustrate a piezoelectric film sensor, wherein the piezoelectric film 32 is disposed between and pair of conductive coatings 34,35, such as silver ink. The piezoelectric film 32 and conductive coatings 34,35 are coated onto a protective sheet 36 (e.g., mylar) with a protective coating 38 disposed on the opposing side of the upper conductive coating. A pair of conductors 40,42 is attached to a respective conductive coating 34,35. An electrical conductive layer 39, which is grounded, is disposed over the protective coating 38 to provide an electrical shield for the PVDF sensor. The conductive layer may be formed of any electrically conductive material, such a copper sheet. The PVDF sensor is secured to the outer or inner surface relative to the pipe 10 of strap 41 formed of flexibly, stiff material, such as stainless steel.

The thickness of the piezoelectric film 32 may be in the range of 8 um to approximately 110 um. The thickness is dependent on the degree of sensitivity desired or needed to measure the unsteady pressures within the pipe 10. The sensitivity of the sensor 12 increases as the thickness of the piezoelectric film increases. The sensors 12 are similar to that described in U.S. patent application Ser. No. 10/712,818, filed on Nov. 12, 2003 and U.S. patent application Ser. No. 10/795,111, filed on Mar. 4, 2004, which are incorporated herein by reference.

The standoffs 14 are made of a thermally insulative material that will not transmit the high temperature of the pipe 10 directly up to the sensors 12. The PVDF sensors 12 themselves are attached to the outside of a circular band or strap 41, which in turn is connected directly to the standoffs 14. When the arrangement or assembly is attached to the pipe 10, the PVDF sensors 12 will be separated from the pipe 10 by an insulating layer of air generally indicated as 18 at the distance D (see also FIG. 1) that will prevent them from reaching the high temperature of the pipe 10. An array of these PVDF sensors 12 (see FIG. 12) would then permit current array processing techniques known in the art to be utilized to measure a parameter of the fluid flow, including using an analysis based on pressure variations in the fluid or medium flowing in the pipe now known or later developed in the future. While only four standoffs 14 are shown equally spaced around the circumference of the pipe, the invention contemplates that any number of standoffs 14 may be disposed around the pipe 10. The present invention further contemplates that the standoff 14 may comprise a single ring that extends completely around the circumference of the pipe.

The scope of the invention is not intended to be limited to using any particular type or kind of insulating material for the standoffs 14. Moreover, the scope of the invention is intended to include using thermally insulative material now known in the art, as well as those later developed in the future.

Several variations of the aforementioned technique are envisioned within the spirit of the present invention, including using pressure sensors other than PVDF and sensor configurations that totally encompass the circumference of the pipe 10.

FIG. 5 shows an example of a fluid cooled standoff generally indicated as 20 designed to achieve the objectives outlined above. The standoff 20 consists of 3 components: a thermal barrier 21, a standoff ring 22 with a cooling channel 24, and a sensor platform 23.

The thermal barrier 21 is a relatively stiff in compression, yet flexible in bending, low thermal conductivity material in direct contact with a pipe wall 10. For example, the polyimide material may comprise Cirlex having a thickness of 0.06 inches. By way of example, the thermal barrier 21 is shown as a polyimide laminate that is known in the art. However, the scope of the present invention is not intended to be limited to any particular type or kind of thermal barrier material. Moreover, the scope of the present invention is intended to include other types of relatively stiff in compression, yet flexible in bending, low thermal conductivity material now known in the art or later developed in the future.

Figure 6:
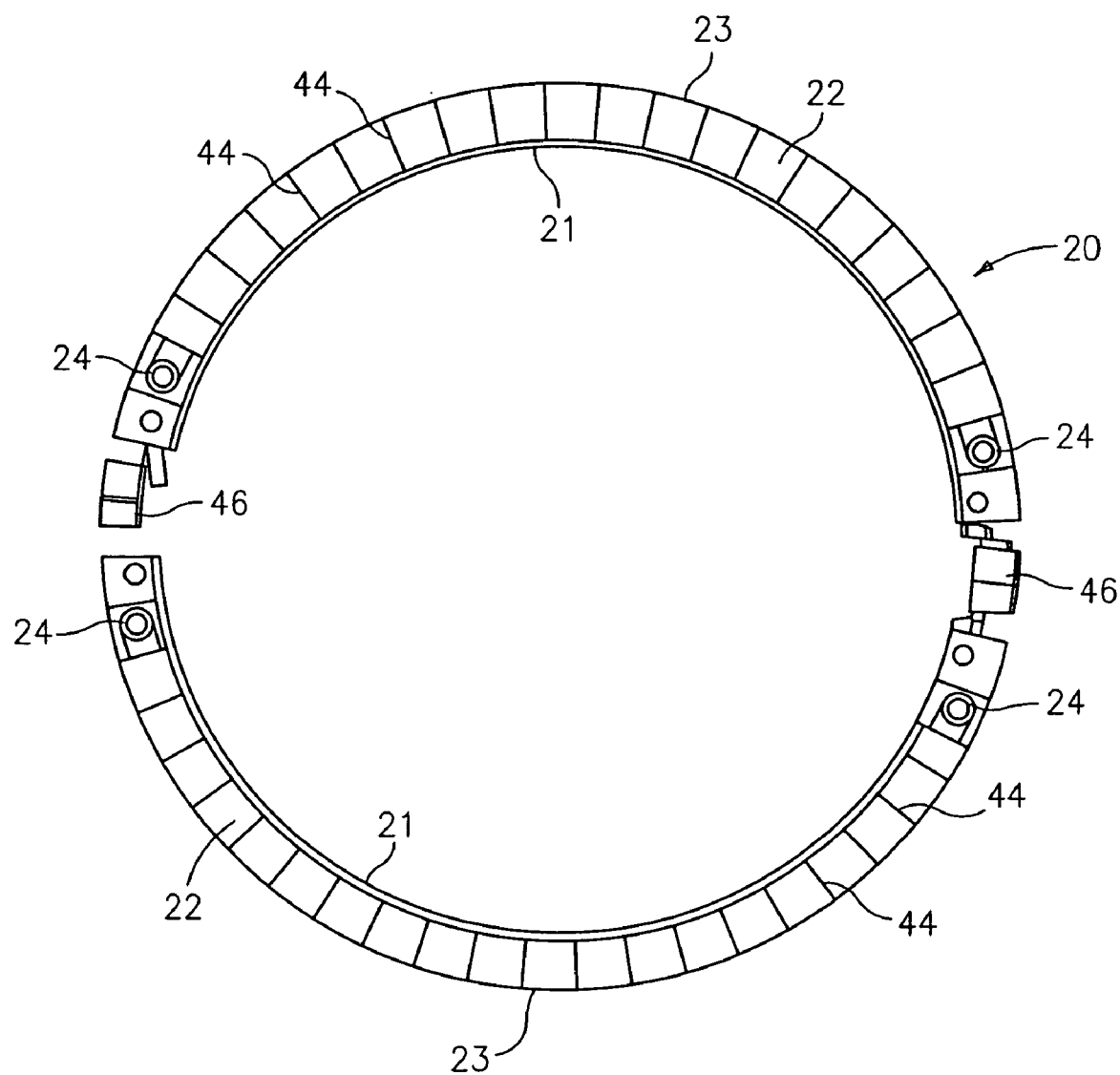
FIG. 6 is a side view of a liquid cooled standoff ring having cooling tubes arranged therein, buckles and partial radial slots that forms part of the present invention.
Figure 7:
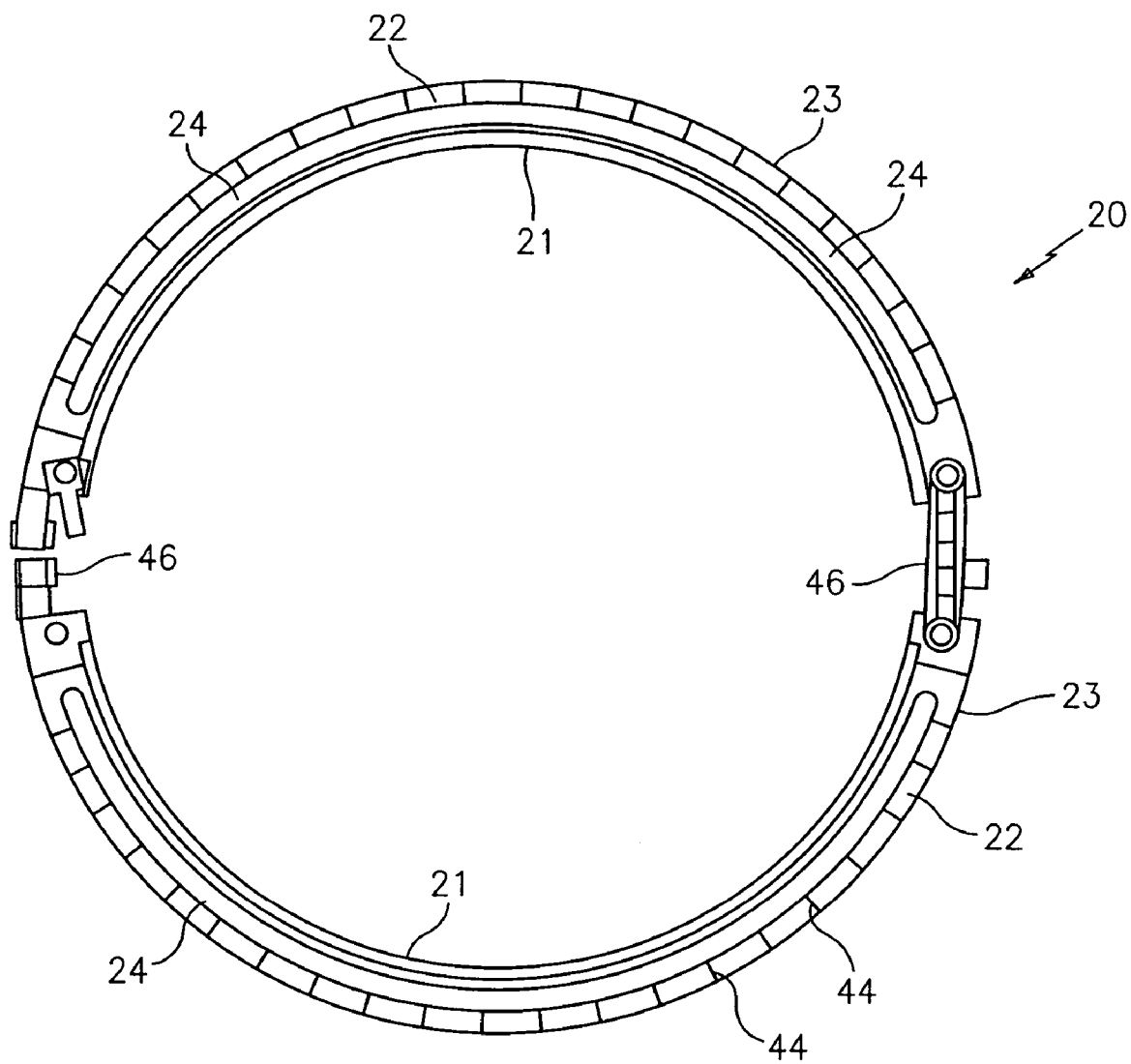
FIG. 7 is a cut-away view of the liquid cooled standoff ring having cooling tubes arranged therein, buckles and partial radial slots of FIG. 6.

The standoff ring 22 is relatively stiff in radial compression, but is made of a material with relatively high thermal conductivity such as steel or aluminum. In this design, the ring 22 is partially segmented into multiple circumferential segments to minimize the increase in hoop stiffness of combined pipe and standoff configuration, as best shown in FIGS. 6 and 7. The standoff ring 22 contains a cooling channel or tubing 24 through which cooling fluid flows. By way of example, the standoff ring 22 is shown as an aluminum material that is known in the art. However, the scope of the present invention is not intended to be limited to any particular type or kind of standoff ring material. Moreover, the scope of the present invention is intended to include other types of material that are relatively stiff in radial compression, but made of a material with relatively high thermal conductivity now known in the art or later developed in the future. Further, the cooling channel 24 shown is made of copper tubing, although the scope of the invention is not intended to be limited to any particular type or kind of cooling channel material. The tube 24 may be attached to the standoff ring 22, such as by welding, soldering or high temperature adhesive.

The sensor platform 23 is a separate band that clamps over the standoff ring 22. For example, the sensor platform 23 may comprise a band 41 of the PVDF sensor 12 of FIGS. 3 and 4. Therefore, the sensor bands 12 are strapped or clamped onto the outer surface of the standoff ring 22. Alternatively, the sensor platform may be fixedly attached to the standoff ring, having the PVDF material secured to the sensor platform 23 as shown in FIGS. 3 and 4. From a circumferential strain measurement perspective, the sensor platform 23 represents a short section of pipe with a circumferential strain field very similar to that in the process piping wall, but at controllable temperature. Thus, systems designed to operate on lower temperature pipes can be applied to higher temperature applications without requiring significant modification.

FIG. 7 shows an engineering drawing of a liquid-cooled standoff generally indicated as 20, having a standoff ring 22, partial radial slots 44, buckles 46 and cooling tubes 24 inside the standoff ring 22. The standoff 20 is fabricated into two, essentially identical, halves, buckled together at installation. FIG. 6 is a cut-away view showing the cooling tubes 24.

The liquid-cooled standoff 20 is shown as including two different pieces coupled by two buckles 46; however, the scope of the invention is not intended to be limited to either of the same. Embodiments of the invention are envisioned using more or less than two different pieces, as well as other suitable coupling devices or buckling devices.

Figure 8:
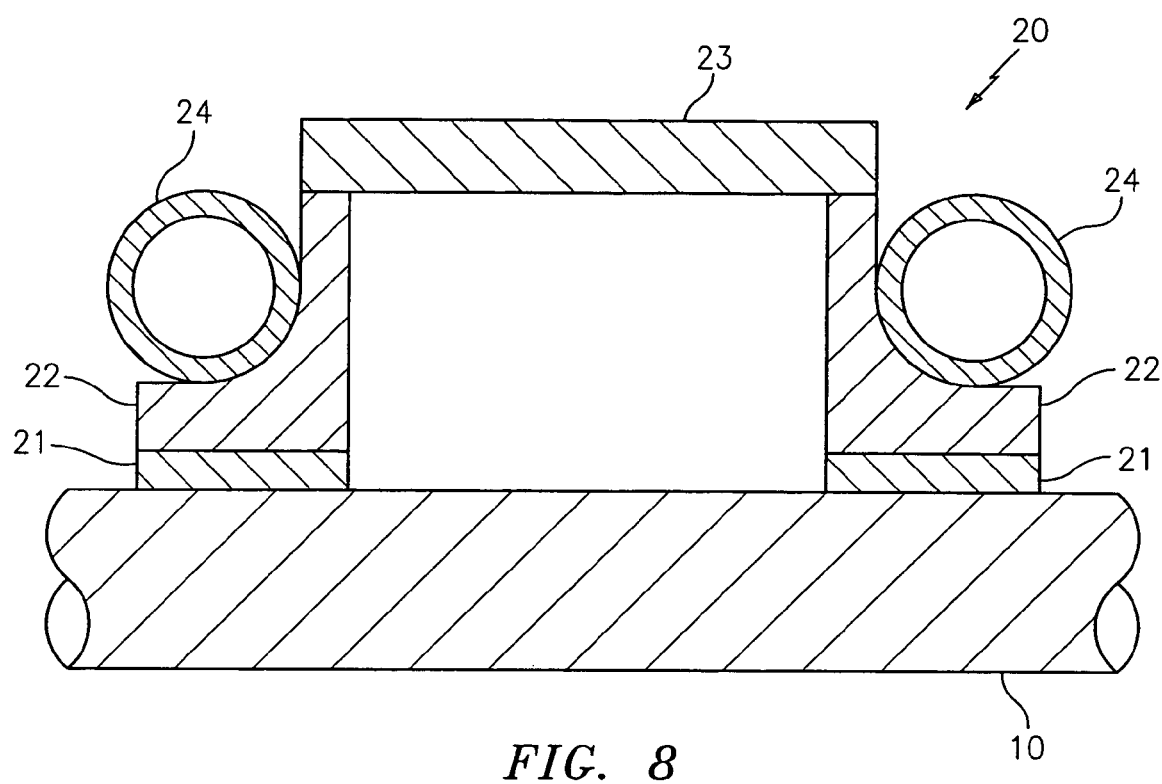
FIGS. 8 and 9 are cross-sectional views of other embodiments of a fluid cooled standoff mounted to a pipe, in accordance with the present invention.
Figure 9:
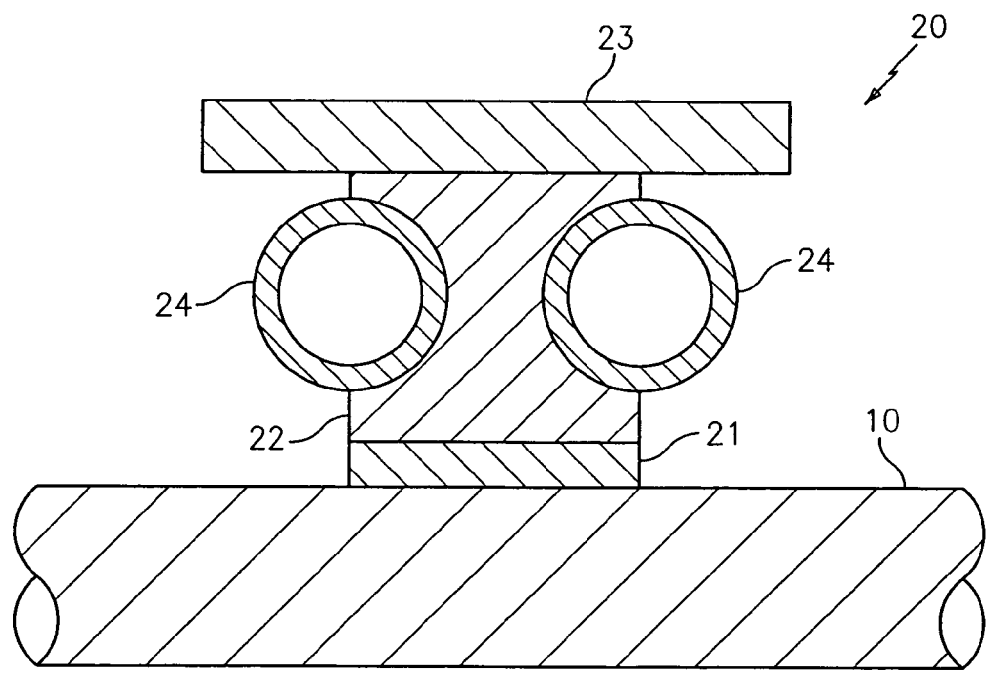

While FIG. 5 illustrates a configuration as a standoff sensor 20, the present invention contemplates other configurations having a thermal barrier 21, a stand ring 22, a cooling channel 24 and a sensor platform, similar to those shown in FIGS. 8 and 9.

Figure 10:
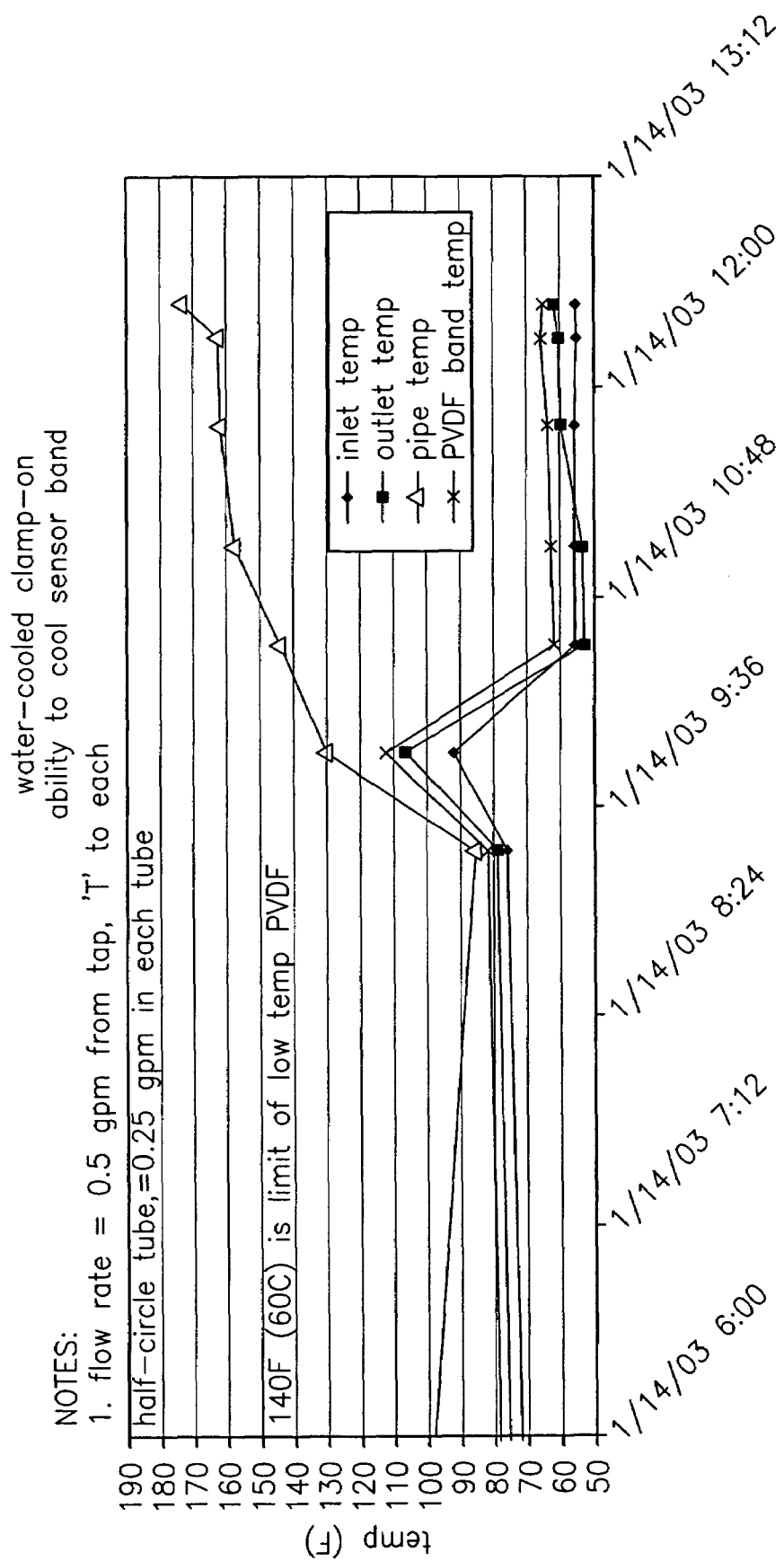
FIG. 10 is a graph of data from thermal testing of the system according to the present invention.

FIG. 10 shows thermal data in which pipe temperature and sensor platform temperature were measured, as was the flow rate and temperature of the cooling water going into and out of the standoff 20. This data served to determine the required flow rates for a given temperature load.

Figure 11:
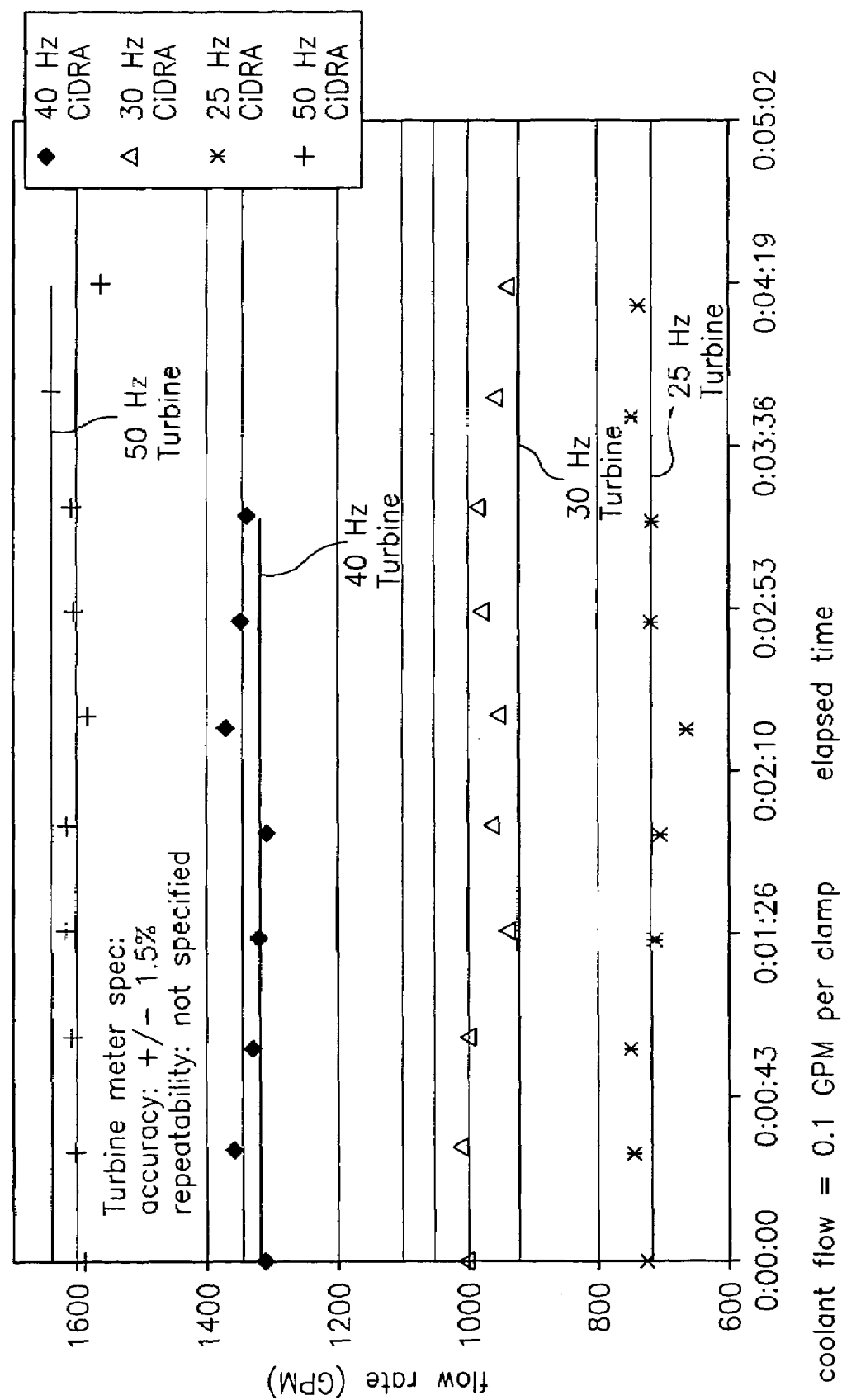
FIG. 11 is a graph of flow rate data of a system having an array of actively cooled sensors embodying the present invention and flow rate data of a turbine meter.
Figure 12:
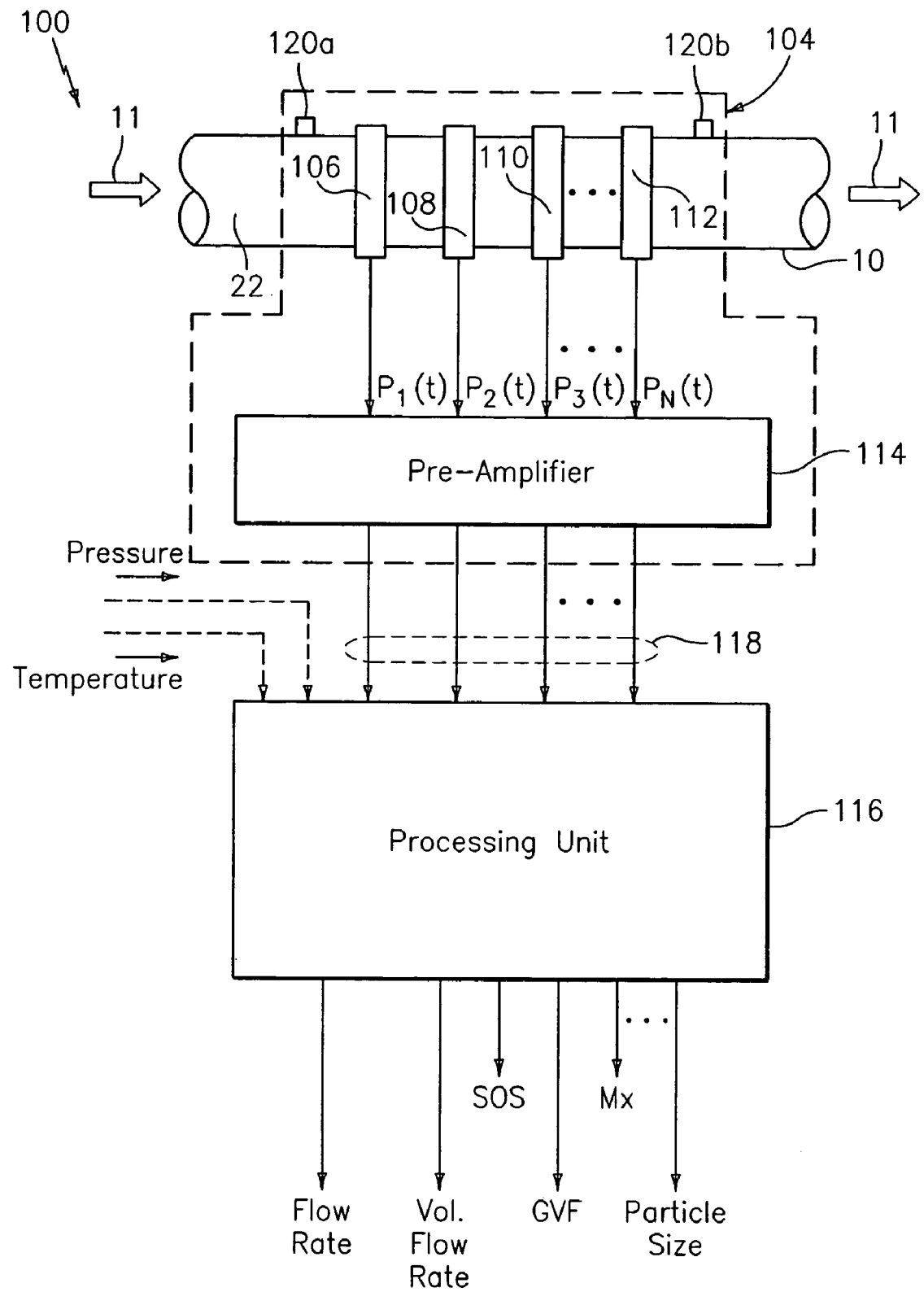
FIG. 12 is a schematic diagram of a flow measurement apparatus having an array of sensors, in accordance with the present invention.

FIG. 11 shows flow measurement data derived from an array of sensors 20 disposed axially along the pipe 10, as shown in FIG. 12. As shown, the array based flow meter tracks well with the turbine flow meter reference. For the data presented, 0.1 gallons per minute (gpm) of cooling water was flowing through each half of each standoff.

FIG. 12 shows, by way of example, an embodiment of the present using a pressure sensing system generally indicated as 100 having a sensing device 104 for sensing variations in pressure caused by the flow of a fluid or medium 11 as it travels down a pipe 10. The sensing device 104 includes an array of strain-based sensors 106, 108, 110, 112 arranged in relation to the pipe 10. The array of strain-based sensors 106, 108, 110, 112 is arranged on standoffs consistent with that shown and described herein and similar to sensors 20 of FIGS. 3-7. In operation, the array of strain-based sensors 106, 108, 110, 112 respond to pressure variations caused by the flow of the fluid or medium in the pipe 10, for providing sensor signals $P_1(t), P_2(t), P_3(t), \ldots, P_N(t)$ to a pre-amplifier 114, which pre-amplifies these sensed signals and provides pre-amplified sensed signals to a processing unit 116. The processing unit 116 processing pre-amplified sensed signals using one or more techniques known in the art, and provides information about the fluid or medium flowing in the pipe 10, including flow rate, volumetric flow rate, speed of sound, GVF, Mx, particle size, etc.

In particular, the array of strain-based sensors or pressure sensors 106, 108, 110, 112 measure the unsteady pressures produced by vortical disturbances within the pipe and/or speed of sound propagating through the flow, which are indicative of parameters and/or characteristics of the process flow 11. The pressure signals $P_1(t)$-$P_N(t)$ are provided to the processing unit 116, which digitizes the pressure signals and computes the appropriate flow parameter(s). A cable generally indicated as 118 electronically connects the sensing device 104 to the processing unit 116.

The array of strain-based sensors or pressure sensors 106, 108, 110, 112 may include any number of pressure sensors greater than two sensors, such as three, four, eight, sixteen or N number of sensors between two and twenty-four sensors. Generally, the accuracy of the measurement improves as the number of sensors in the array increases. The degree of accuracy provided by the greater number of sensors is offset by the increase in complexity and time for computing the desired output parameter of the flow. Therefore, the number of sensors used is dependent at least on the degree of accuracy desired and the desire update rate of the output parameter provided by the apparatus 100. The pressure sensors measure the unsteady pressures produced by acoustic waves propagating through the flow and/or pressure disturbances (e.g., vortical eddies) that convect with the flow within the pipe 10, which are indicative of the SOS propagating through the process flow 11 in the pipe 10 and the velocity of disturbances propagating through the process flow 11, respectively. The processing unit 116 processes the pressure measurement data $P_1(t)$-$P_N(t)$ and determines the desired parameters and characteristics of the process flow, as described hereinbefore.

The pressure sensing system 100 also contemplates providing one or more acoustic sources 120a, 120b to enable the measurement of the speed of sound propagating through the flow for instances of acoustically quiet flow. The acoustic source may be a device the taps or vibrates on the wall of the pipe, for example. The acoustic sources may be disposed at the input end of output end of the array of sensors 106, 108, 110, 112, or at both ends as shown. One should appreciate that in most instances the acoustics sources are not necessary and the apparatus passively detects the acoustic ridge provided in the process flow 11. The passive noise includes noise generated by pumps, valves, motors, and the turbulent mixture itself.

As suggested and further described in greater detail hereinafter, the system 100 has the ability to measure the speed of sound (SOS) and flow rate (or velocity) using one or both of the following techniques described herein below:

1) Determining the speed of sound of acoustical disturbances or sound waves propagating through the process flow 11 using the array of pressure sensors 106, 108, 110, 112, and/or
2) Determining the velocity of pressure disturbances (e.g., vortical eddies) propagating through the process flow 11 using the array of pressure sensors 106, 108, 110, 112.

Generally, the first technique measures unsteady pressures created by acoustical disturbances propagating through the process flow 11 to determine the speed of sound (SOS) propagating through the flow. Knowing the pressure and/or temperature of the flow and the speed of sound of the acoustic disturbances or waves, the processing unit 116 can determine include the volumetric flow of the fluid, the consistency or composition of the fluid, the density of the fluid, the Mach number of the fluid, the average size of particles flowing through the fluid, the air/mass ratio of the fluid, and/or the percentage of entrained air within a liquid or slurry, such as that described in U.S. patent application Ser. No. 10/349,716, filed Jan. 23, 2003, U.S. patent application Ser No. 10/376,427, filed Feb. 26, 2003, U.S. patent application Ser. No. 10/762,410, filed Jan. 21, 2004, which are all incorporated by reference in their entirety.

The second technique measures the velocities associated with unsteady flow fields and/or pressure disturbances, such as that created by vortical disturbances or "eddies" 88 (see FIG. 11c), that convect with the process flow 11 to determine the velocity of the process flow. The pressure sensors 106, 108, 110, 112 measure the unsteady pressures $P_1$-$P_N$ created by the vortical disturbances 88, for example, as these disturbances convect with the process flow 11 through the pipe 10 in a manner known in the art. Therefore, the velocity of these vortical disturbances is related to the velocity of the process flow 11 and hence the volumetric flow rate, for example, may be determined, as will be described in greater detail hereinafter.

Velocity Processing

Figure 13:
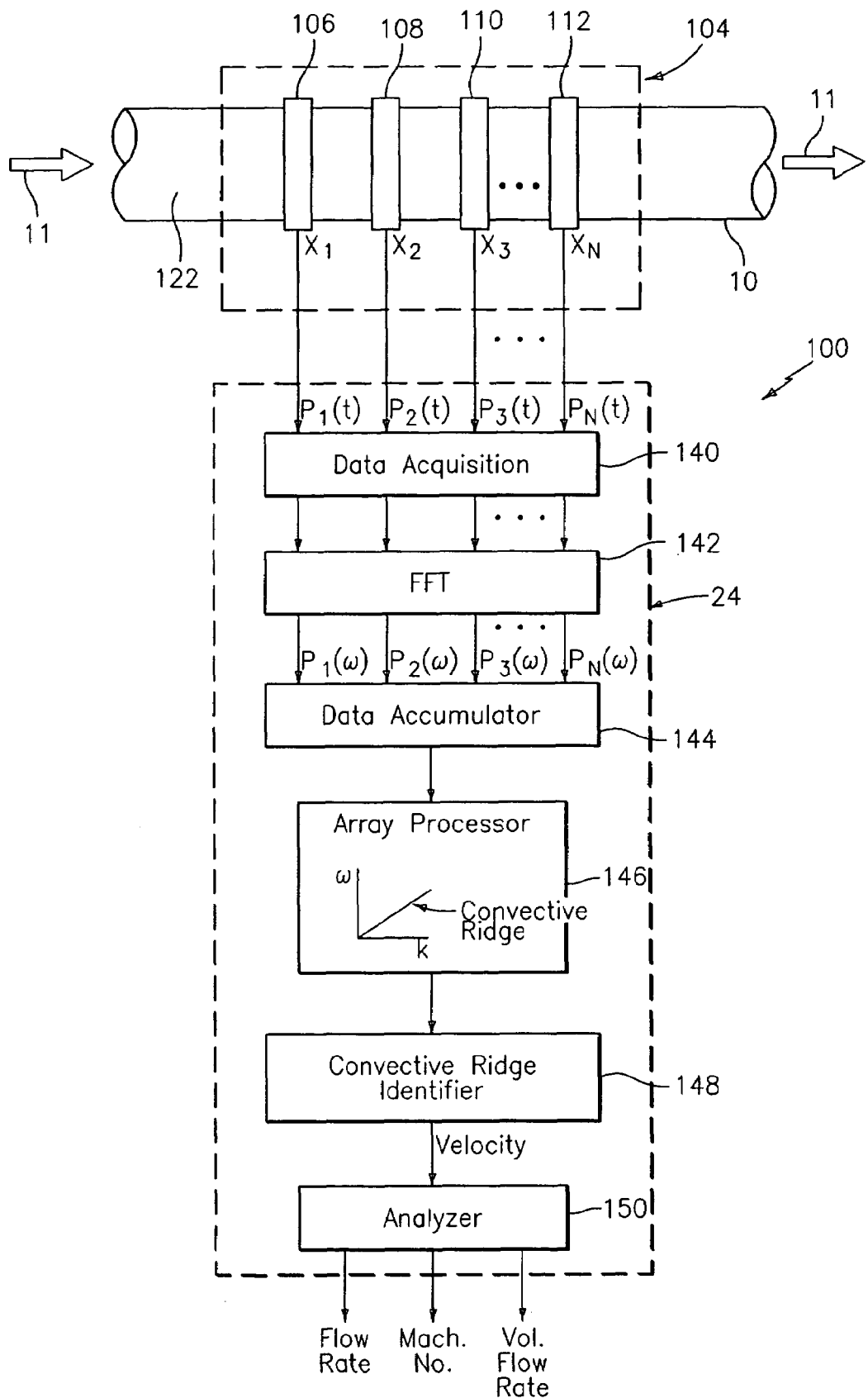
FIG. 13 is a schematic diagram of a flow measurement apparatus having an array of sensors illustrating the method of processing to determine velocity of the fluid flow in accordance with the present invention.
Figure 14:
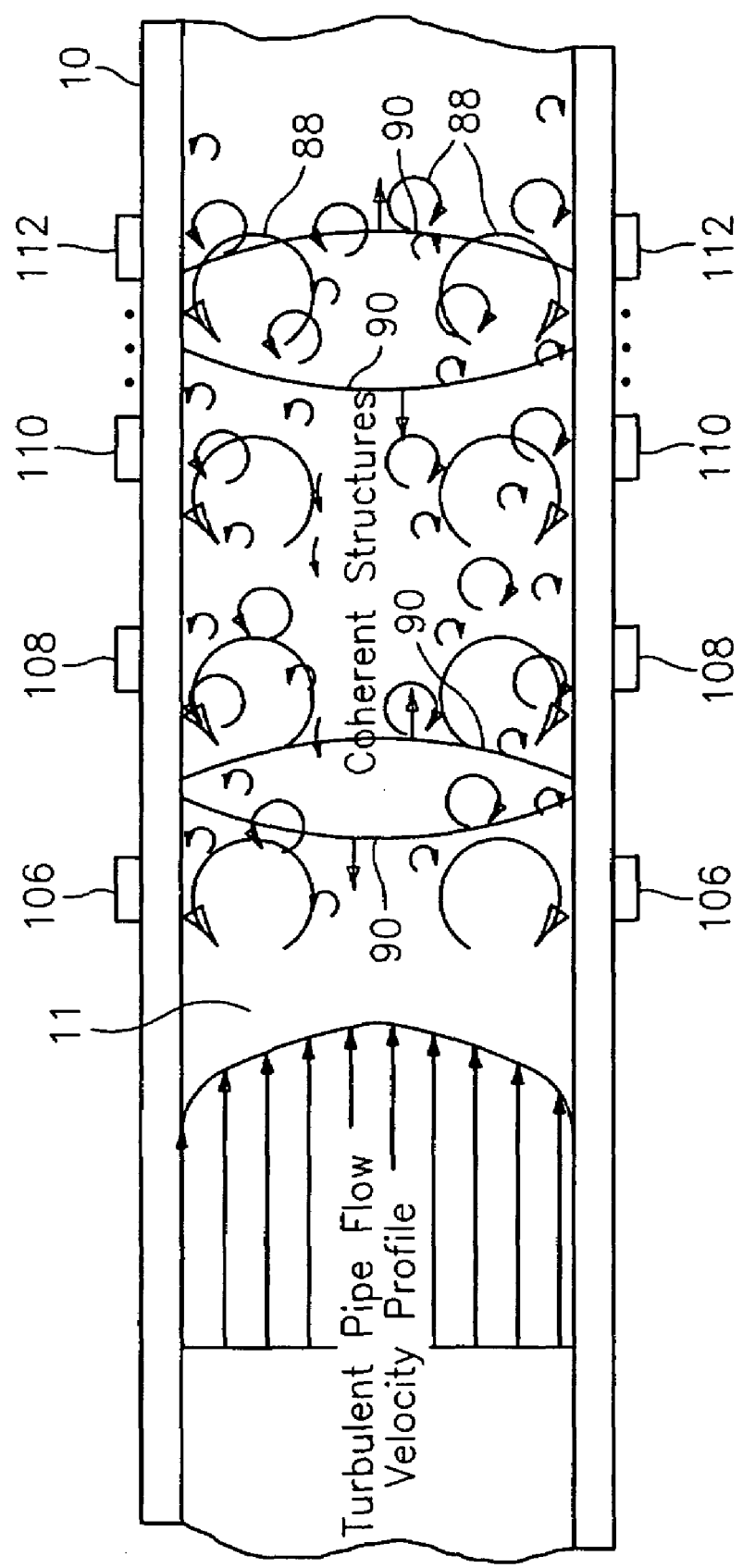
FIG. 14 is a cross-sectional view of a pipe having a turbulent pipe flowing having coherent structures therein, in accordance with the present invention.

As shown in FIG. 13, an apparatus 100 embodying the present invention has an array of at least two pressure sensors 106,108, located at two locations $x_1, x_2$ axially along the pipe 10 for sensing respective stochastic signals propagating between the sensors 106,108 within the pipe at their respective locations. Each sensor 106,108 provides a signal indicating an unsteady pressure at the location of each sensor, at each instant in a series of sampling instants. One will appreciate that the sensor array may include more than two pressure sensors as depicted by pressure sensor 110,112 at location $x_3, x_N$. The pressure generated by the convective pressure disturbances (e.g., eddies 88, see FIG. 14) may be measured through strained-based sensors and/or pressure sensors 106,108,110,112. The pressure sensors provide analog pressure time-varying signals $P_1(t), P_2(t), P_3(t), P_N(t)$ to the signal processing unit 116. The processing unit 116 processes the pressure signals to first provide output signals indicative of the pressure disturbances that convect with the flow 11, and subsequently, provide output signals in response to pressure disturbances generated by convective waves propagating through the flow 11, such as velocity, Mach number and volumetric flow rate of the process flow 11.

The processing unit 24 receives the pressure signals from the array of sensors 106,108,110,112. A data acquisition unit 140 (e.g., A/D converter) converts the analog signals to respective digital signals. The FFT logic calculates the Fourier transform of the digitized time-based input signals $P_1(t)$-$P_N(t)$ and provides complex frequency domain (or frequency based) signals $P_1(\omega), P_2(\omega), P_3(\omega), P_N(\omega)$ indicative of the frequency content of the input signals. Instead of FFT's, any other technique for obtaining the frequency domain characteristics of the signals $P_1(t)$-$P_N(t)$, may be used. For example, the cross-spectral density and the power spectral density may be used to form a frequency domain transfer functions (or frequency response or ratios) discussed hereinafter.

One technique of determining the convection velocity of the turbulent eddies 88 within the process flow 11 is by characterizing a convective ridge of the resulting unsteady pressures using an array of sensors or other beam forming techniques, similar to that described in U.S. patent application, Ser. No. 10/007,736 and U.S. patent application, Ser. No. 09/729,994, filed Dec. 4, 200, now U.S. Pat. No. 6,609,069, which are incorporated herein by reference.

A data accumulator 144 accumulates the frequency signals $P_1(\omega)$-$P_N(\omega)$ over a sampling interval, and provides the data to an array processor 46, which performs a spatial-temporal (two-dimensional) transform of the sensor data, from the xt domain to the k-$\omega$ domain, and then calculates the power in the k-$\omega$ plane, as represented by a k-$\omega$ plot.

The array processor 146 uses standard so-called beam forming, array processing, or adaptive array-processing algorithms, i.e. algorithms for processing the sensor signals using various delays and weighting to create suitable phase relationships between the-signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

The prior art teaches many algorithms of use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensor units apart from each other and yet still be within the coherence length.

Convective characteristics or parameters have a dispersion relationship that can be approximated by the straight-line equation, $$k=\omega/u,$$

where u is the convection velocity (flow velocity). A plot of k-$\omega$ pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. What is being sensed are not discrete events of turbulent eddies, but rather a continuum of possibly overlapping events forming a temporally stationary, essentially white process over the frequency range of interest. In other words, the convective eddies 88 is distributed over a range of length scales and hence temporal frequencies.

To calculate the power in the k-$\omega$ plane, as represented by a k-$\omega$ plot (see FIG. 15) of either the signals, the array processor 146 determines the wavelength and so the (spatial) wavenumber k, and also the (temporal) frequency and so the angular frequency $\omega$, of various of the spectral components of the stochastic parameter. There are numerous algorithms available in the public domain to perform the spatiautemporal decomposition of arrays of sensor units 106,108,110, 112.

Figure 15:
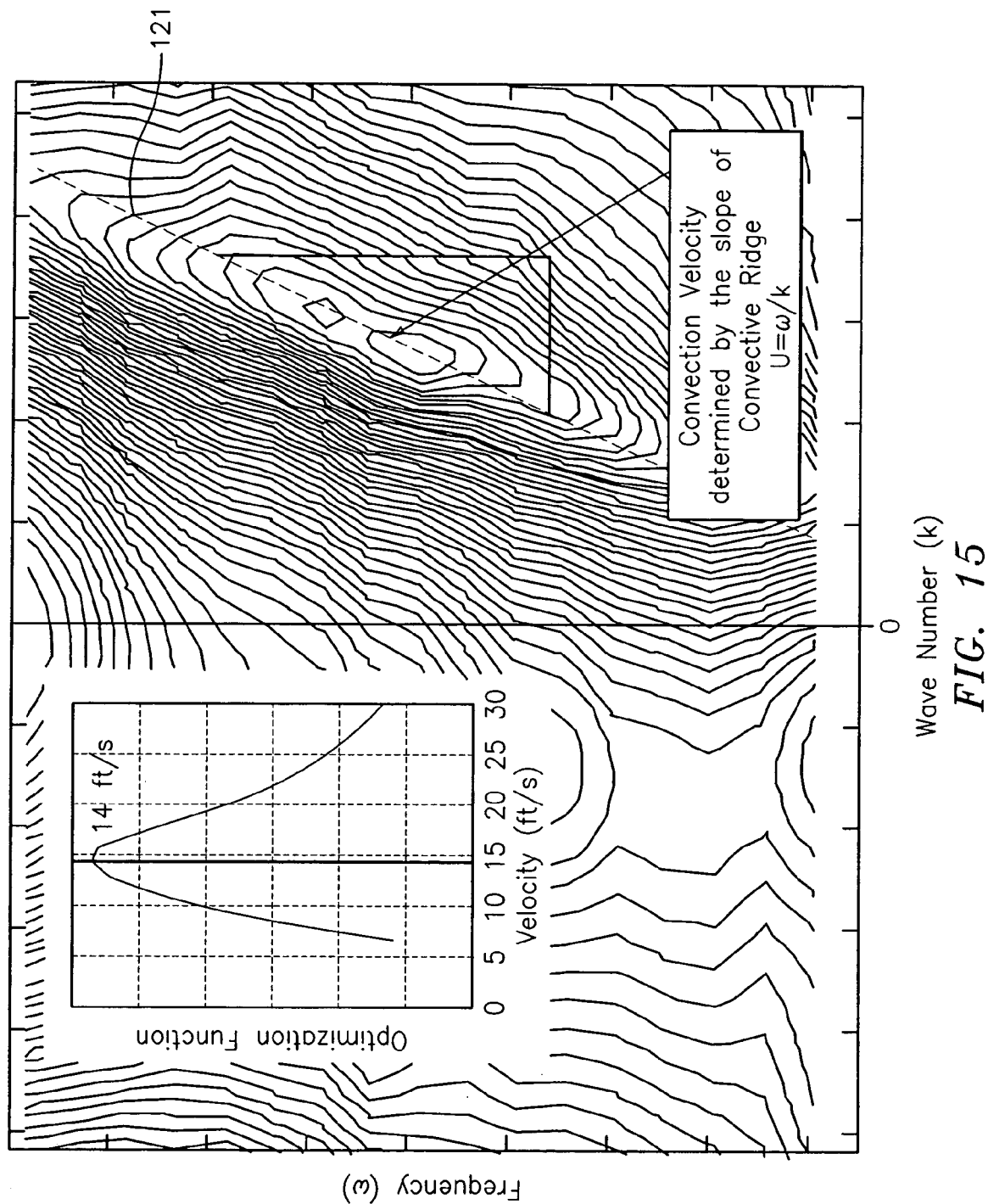
FIG. 15 a kω plot of data processed from an apparatus embodying the present invention that illustrates slope of the convective ridge, and a plot of the optimization function of the convective ridge, in accordance with the present invention.

The present invention may use temporal and spatial filtering to precondition the signals to effectively filter out the common mode characteristics $P_{common\ mode}$ and other long wavelength (compared to the sensor spacing) characteristics in the pipe 10 by differencing adjacent sensors and retain a substantial portion of the stochastic parameter associated with the flow field and any other short wavelength (compared to the sensor spacing) low frequency stochastic parameters. In the case of suitable turbulent eddies 88 (see FIG. 14) being present, the power in the k-$\omega$ plane shown in a k-$\omega$ plot of FIG. 15 shows a convective ridge 121. The convective ridge represents the concentration of a stochastic parameter that convects with the flow and is a mathematical manifestation of the relationship between the spatial variations and temporal variations described above. Such a plot will indicate a tendency for k-$\omega$ pairs to appear more or less along a line 121 with some slope, the slope indicating the flow velocity.

Once the power in the k-$\omega$ plane is determined, a convective ridge identifier 148 uses one or another feature extraction method to determine the location and orientation (slope) of any convective ridge 121 present in the k-$\omega$ plane. In one embodiment, a so-called slant stacking method is used, a method in which the accumulated frequency of k-$\omega$ pairs in the k-$\omega$ plot along different rays emanating from the origin are compared, each different ray being associated with a different trial convection velocity (in that the slope of a ray is assumed to be the flow velocity or correlated to the flow velocity in a known way). The convective ridge identifier 148 provides information about the different trial convection velocities, information referred to generally as convective ridge information.

The analyzer 150 examines the convective ridge information including the convective ridge orientation (slope). Assuming the straight-line dispersion relation given by k=$\omega$/u, the analyzer 150 determines the flow velocity, Mach number and/or volumetric flow. The volumetric flow is determined by multiplying the cross-sectional area of the inside of the pipe with the velocity of the process flow.

SOS Processing

Figure 16:
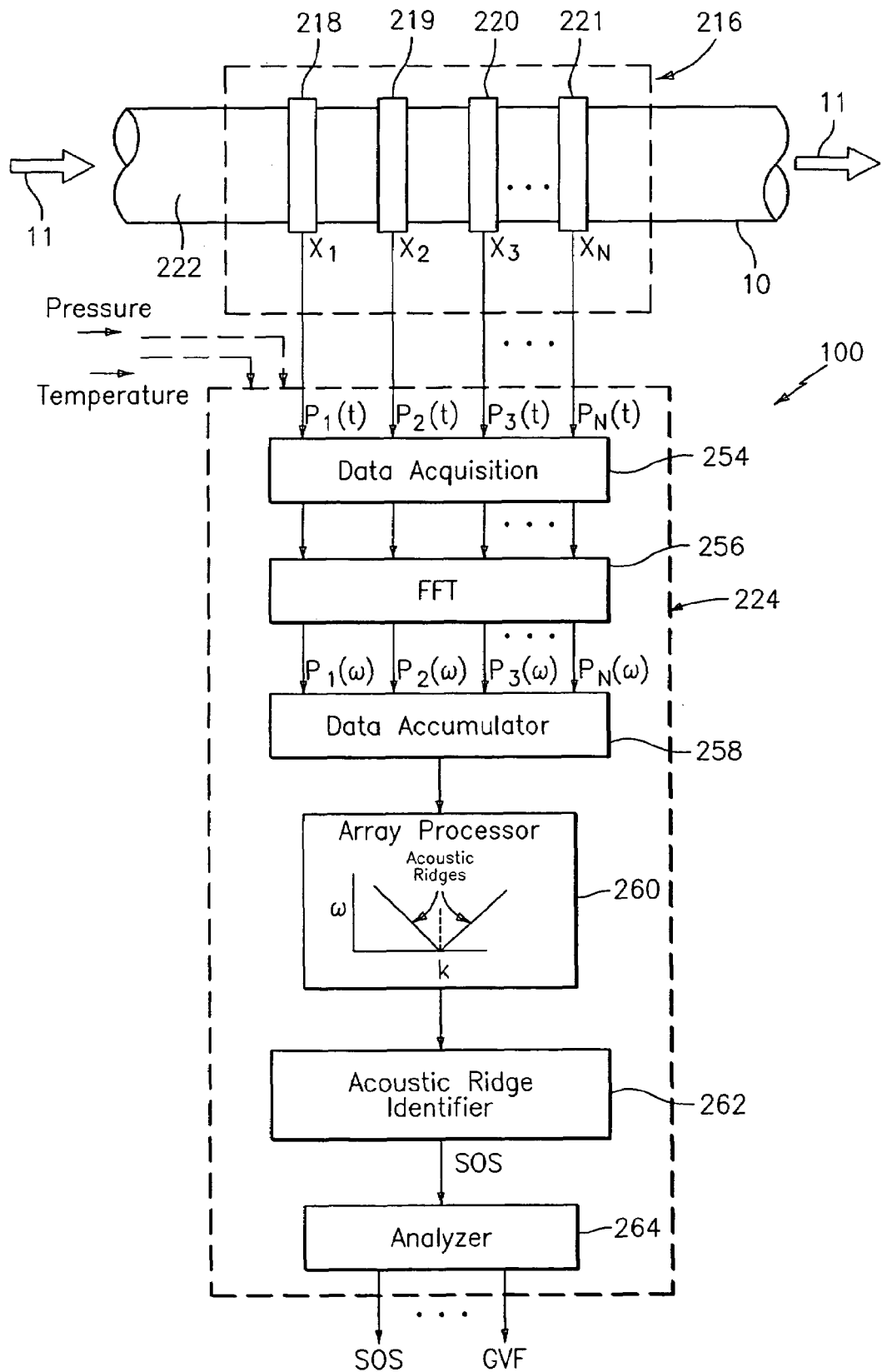
FIG. 16 is a schematic diagram of a flow measurement apparatus having an array of sensors illustrating the method of processing to determine speed of sound propagating through the fluid flow in accordance with the present invention.

Similar to the apparatus 100 of FIG. 13, an apparatus 200 of FIG. 16 embodying the present invention has an array of at least two pressure sensors 218,219, located at two locations $x_1,x_2$ axially along the pipe 10 for sensing respective stochastic signals propagating between the sensors 218,219 within the pipe at their respective locations. Each sensor 218,219 provides a signal indicating an unsteady pressure at the location of each sensor, at each instant in a series of sampling instants. One will appreciate that the sensor array may include more than two pressure sensors as depicted by pressure sensor 220,221 at location $x_3,x_N$. The pressure generated by the acoustic pressure disturbances (e.g., eddies 88, see FIG. 14) may be measured through strained-based sensors and/or pressure sensors 218-221. The pressure sensors 218-221 provide analog pressure time-varying signals $P_1(t),P_2(t),P_3(t),P_N(t)$ to the signal processing unit 224. The processing unit processes the pressure signals to first provide output signals indicative of the speed of sound propagating through the flow 11, and subsequently, provide output signals in response to pressure disturbances generated by acoustic waves propagating through the flow 11, such as velocity, Mach number and volumetric flow rate of the process flow 11.

The processing unit 224 receives the pressure signals from the array of sensors 218-221. A data acquisition unit 254 digitizes pressure signals $P_1(t)$-$P_N(t)$ associated with the acoustic waves 90 propagating through the pipe 10. Similarly to the FFT logic 142, an FFT logic 256 of FIG. 13 calculates the Fourier transform of the digitized time-based input signals $P_1(t)$-$P_N(t)$ and provide complex frequency domain (or frequency based) signals $P_1(\omega),P_2(\omega),P_3(\omega),P_N(\omega)$ indicative of the frequency content of the input signals.

A data accumulator 258 accumulates the additional signals $P_1(t)$-$P_N(t)$ from the sensors, and provides the data accumulated over a sampling interval to an array processor 260, which performs a spatial-temporal (two-dimensional) transform of the sensor data, from the xt domain to the k-$\omega$ domain, and then calculates the power in the k-$\omega$ plane, as represented by a k-$\omega$ plot, similar to that provided by the convective array processor 246.

To calculate the power in the k-$\omega$ plane, as represented by a k-$\omega$ plot (see FIG. 17) of either the signals or the differenced signals, the array processor 60 determines the wavelength and so the (spatial) wavenumber k, and also the (temporal) frequency and so the angular frequency $\omega$, of various of the spectral components of the stochastic parameter. There are numerous algorithms available in the public domain to perform the spatial/temporal decomposition of arrays of sensor units 218-221.

Figure 17:
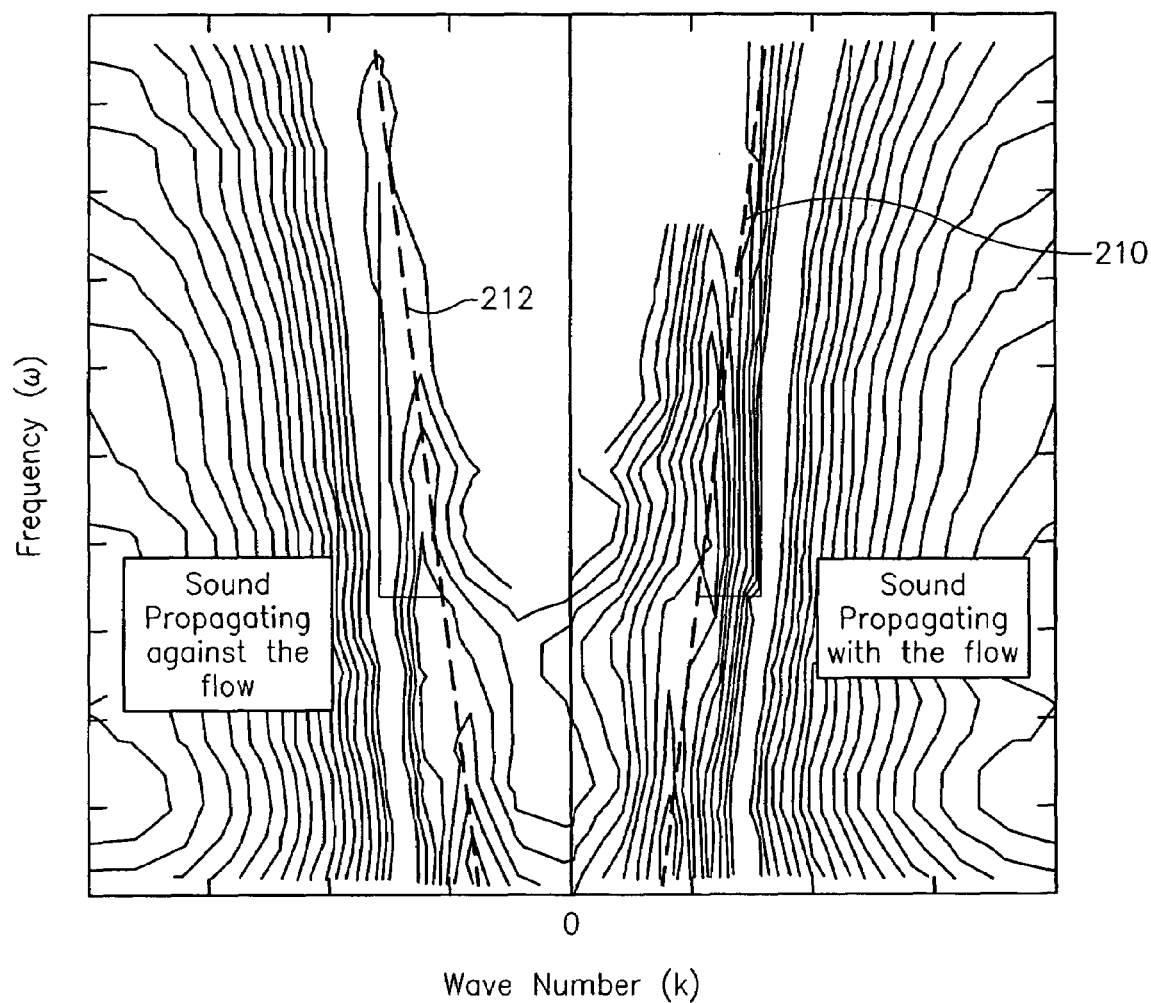
FIG. 17 a kω plot of data processed from an apparatus embodying the present invention that illustrates slope of the acoustic ridges, in accordance with the present invention.

In the case of suitable acoustic waves 90 being present in both axial directions, the power in the k-$\omega$ plane shown in a k-$\omega$ plot of FIG. 17 so determined will exhibit a structure that is called an acoustic ridge 210,212 in both the left and right planes of the plot, wherein one of the acoustic ridges 210 is indicative of the speed of sound traveling in one axial direction and the other acoustic ridge 212 being indicative of the speed of sound traveling in the other axial direction. The acoustic ridges represent the concentration of a stochastic parameter that propagates through the flow and is a mathematical manifestation of the relationship between the spatial variations and temporal variations described above. Such a plot will indicate a tendency for k-$\omega$ pairs to appear more or less along a line 210,212 with some slope, the slope indicating the speed of sound.

The power in the k-$\omega$ plane so determined is then provided to an acoustic ridge identifier 262, which uses one or another feature extraction method to determine the location and orientation (slope) of any acoustic ridge present in the left and right k-$\omega$ plane. The velocity may be determined by using the slope of one of the two acoustic ridges 210,212 or averaging the slopes of the acoustic ridges.

Finally, information including the acoustic ridge orientation (slope) is used by an analyzer 264 to determine the flow parameters relating to measured speed of sound, such as the consistency or composition of the flow, the density of the flow, the average size of particles in the flow, the air/mass ratio of the flow, gas volume fraction of the flow, the speed of sound propagating through the flow, and/or the percentage of entrained air within the flow.

Similar to the array processor 146 of FIG. 13, the array processor 260 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by k=$2\pi/\lambda$ where $\lambda$ is the wavelength of a spectral component, and corresponding angular frequencies given by $\omega=2_\pi v$.

One such technique of determining the speed of sound propagating through the flow 11 is using array processing techniques to define an acoustic ridge in the k-$\omega$ plane as shown in FIG. 17. The slope of the acoustic ridge is indicative of the speed of sound propagating through the flow 11. The speed of sound (SOS) is determined by applying sonar arraying processing techniques to determine the speed at which the one dimensional acoustic waves propagate past the axial array of unsteady pressure measurements distributed along the pipe 10.

The apparatus 200 of the present invention measures the speed of sound (SOS) of one-dimensional sound waves propagating through the mixture to determine the gas volume fraction of the mixture. It is known that sound propagates through various mediums at various speeds in such fields as SONAR and RADAR fields. The speed of sound propagating through the pipe and flow 11 may be determined using a number of known techniques, such as those set forth in U.S. patent application Ser. No. 09/344,094, filed Jun. 25, 1999, now U.S. Pat. No. 6,354,147; U.S. patent application Ser. No. 10/795,111, filed Mar. 4, 2004; U.S. patent application Ser. No. 09/997,221, filed Nov. 28, 2001, now U.S. Pat. No. 6,587,798; U.S. patent application Ser. No. 10/007, 749, filed Nov. 7, 2001, and U.S. patent application Ser. No. 10/762,410, filed Jan. 21, 2004, each of which are incorporated herein by reference.

While the sonar-based flow meter using an array of sensors 218-221 to measure the speed of sound of an acoustic wave propagating through the mixture is shown and described, one will appreciate that any means for measuring the speed of sound of the acoustic wave may used to determine the entrained gas volume fraction of the mixture/fluid or other characteristics of the flow described hereinbefore.

The analyzer 264 of the processing unit 224 provides output signals indicative of characteristics of the process flow 11 that are related to the measured speed of sound (SOS) propagating through the flow 11. For example, to determine the gas volume fraction (or phase fraction), the analyzer 264 assumes a nearly isothermal condition for the flow. As such the gas volume fraction or the void fraction is related to the speed of sound by the following quadratic equation:

$$Ax^2+Bx+C=0$$

wherein x is the speed of sound, A=1+rg/rl*($K_{eff}$/P−1)−$K_{eff}$/P, B=$K_{eff}$/P−2+rg/rl; C=1−$K_{eff}$/rl*$a_{meas}$^2); Rg=gas density, rl=liquid density, $K_{eff}$=effective K (modulus of the liquid and pipewall), P=pressure, and $a_{meas}$=measured speed of sound.

Effectively, $$\text{Gas Voulume Fraction } (GVF)=(-B+\text{sqrt}(B^2-4*A*C))/(2*A)$$

Alternatively, the sound speed of a mixture can be related to volumetric phase fraction ($\phi_i$) of the components and the sound speed (a) and densities ($\rho$) of the component through the Wood equation.

$$\frac{1}{\rho_{mix} a_{mix\infty}^2} = \sum_{i=1}^{N} \frac{\phi_i}{\rho_i a_i^2} \text{ where } \rho_{mix} = \sum_{i=1}^{N} \rho_i \phi_i$$

One dimensional compression waves propagating within a mixture 11 contained within a pipe 10 exert an unsteady internal pressure loading on the pipe. The degree to which the pipe displaces as a result of the unsteady pressure loading influences the speed of propagation of the compression wave. The relationship among the infinite domain speed of sound and density of a mixture; the elastic modulus (E), thickness (t), and radius (R) of a vacuum-backed cylindrical conduit; and the effective propagation velocity ($a_{eff}$) for one dimensional compression is given by the following expression:

$$a_{eff} = \frac{1}{\sqrt{1/a_{mix\infty}^2 + \rho_{mix}\frac{2R}{Et}}} \quad (\text{eq 1})$$

Figure 18:
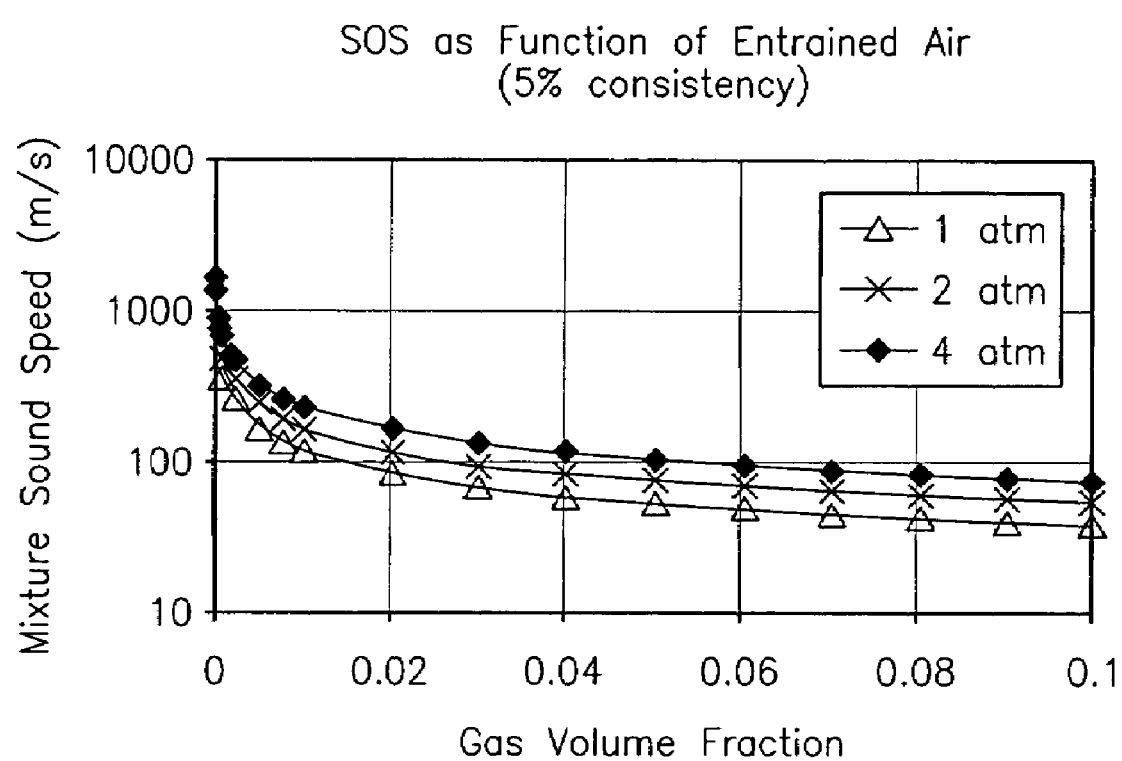
FIG. 18 is a plot of mixture sound speed as a function of gas volume fraction for a 5% consistency slurry over a range of process pressures, in accordance with the present invention.

The mixing rule essentially states that the compressibility of a mixture (1/($\rho$ a$^2$)) is the volumetrically-weighted average of the compressibilities of the components. For gas/liquid mixtures 11 at pressure and temperatures typical of paper and pulp industry, the compressibility of gas phase is orders of magnitudes greater than that of the liquid. Thus, the compressibility of the gas phase and the density of the liquid phase primarily determine mixture sound speed, and as such, it is necessary to have a good estimate of process pressure to interpret mixture sound speed in terms of volumetric fraction of entrained gas. The effect of process pressure on the relationship between sound speed and entrained air volume fraction is shown in FIG. 18.

As described hereinbefore, the apparatus 200 of the present invention includes the ability to accurately determine the average particle size of a particle/air or droplet/air mixture within the pipe 10 and the air to particle ratio. Provided there is no appreciable slip between the air and the solid coal particle, the propagation of one dimensional sound wave through multiphase mixtures is influenced by the effective mass and the effective compressibility of the mixture. For an air transport system, the degree to which the no-slip assumption applies is a strong function of particle size and frequency. In the limit of small particles and low frequency, the no-slip assumption is valid. As the size of the particles increases and the frequency of the sound waves increase, the non-slip assumption becomes increasing less valid. For a given average particle size, the increase in slip with frequency causes dispersion, or, in other words, the sound speed of the mixture to change with frequency. With appropriate calibration the dispersive characteristic of a mixture 11 will provide a measurement of the average particle size, as well as, the air to particle ratio (particle/fluid ratio) of the mixture.

In accordance with the present invention the dispersive nature of the system utilizes a first principles model of the interaction between the air and particles. This model is viewed as being representative of a class of models that seek to account for dispersive effects. Other models could be used to account for dispersive effects without altering the intent of this disclosure (for example, see the paper titled "Viscous Attenuation of Acoustic Waves in Suspensions" by R. L. Gibson, Jr. and M. N. Toksöz), which is incorporated herein by reference. The model allows for slip between the local velocity of the continuous fluid phase and that of the particles.

The following relation can be derived for the dispersive behavior of an idealized fluid particle mixture.

$$a_{mix}(\omega) = a_f \sqrt{\frac{1}{1 + \frac{\varphi_p \rho_p}{\rho_f \left(1 + \omega^2 \frac{\rho_p^2 v_p^2}{K^2}\right)}}}$$

In the above relation, the fluid SOS, density ($\rho$) and viscosity ($\phi$) are those of the pure phase fluid, $v_p$ is the volume of individual particles and $\phi_p$ is the volumetric phase fraction of the particles in the mixture.

Figure 19:
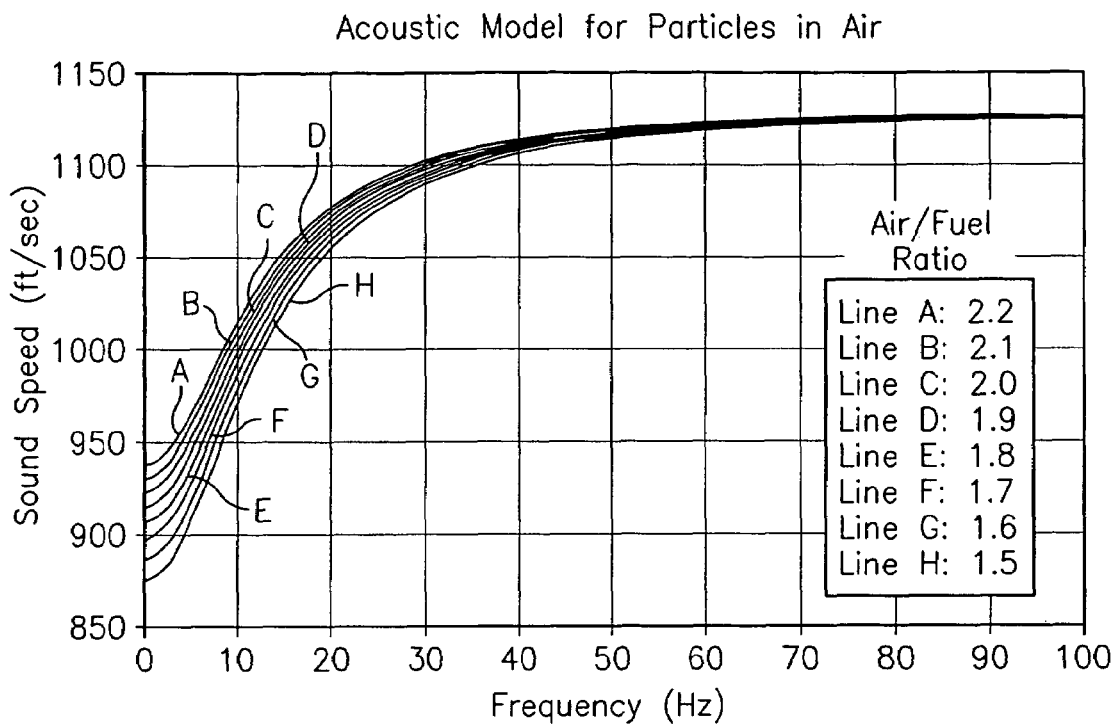
FIG. 19 is a plot of sound speed as a function of frequency for air/particle mixtures with fixed particle size and varying air-to-particle mass ratio in accordance with the present invention.
Figure 20:
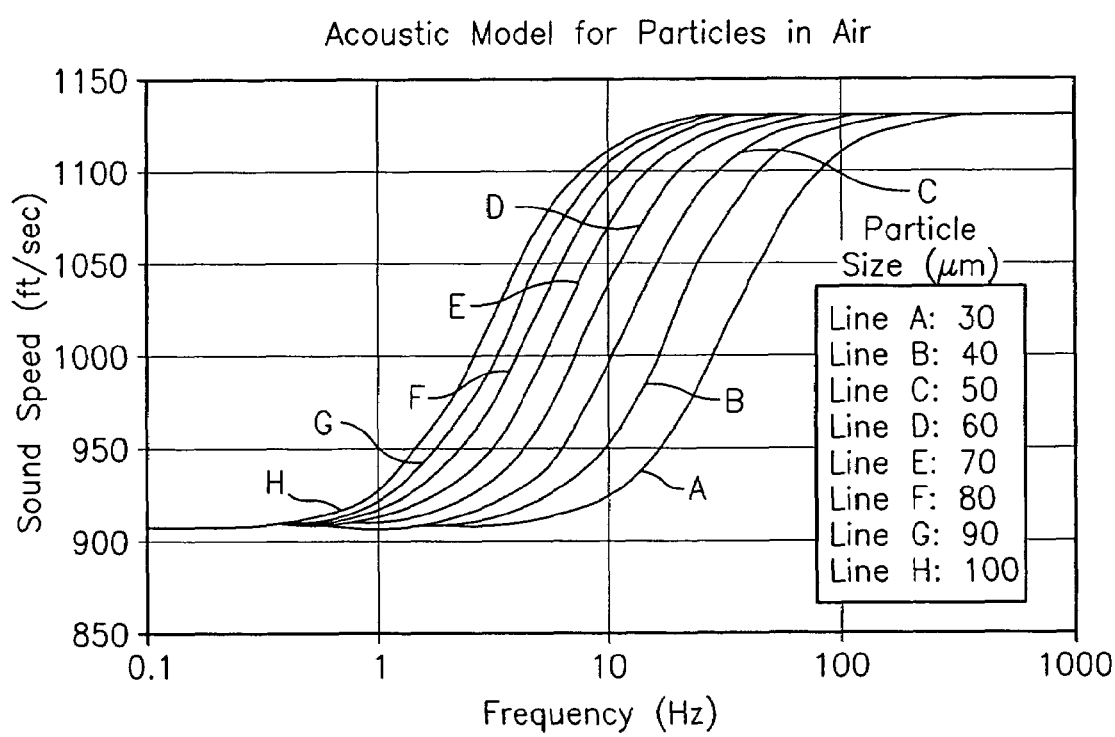
FIG. 20 is a plot of sound speed as a function of frequency for air/particle mixtures with varying particle size where the air-to-particle mass ratio is fixed in accordance with the present invention.

Two parameters of particular interest in steam processes and air-conveyed particles processes are particle size and air-to-fuel mass ratio or steam quality. To this end, it is of interest to examine the dispersive characteristics of the mixture as a function of these two variables. FIGS. 19 and 20 show the dispersive behavior in relations to the speed of sound for coal/air mixtures with parameters typical of those used in pulverized coal deliver systems.

In particular FIG. 19 shows the predicted behavior for nominally 50 um size coal in air for a range of air-to-fuel ratios. As shown, the effect of air-to-fuel ratio is well defined in the low frequency limit. However, the effect of the air-to-fuel ratio becomes indistinguishable at higher frequencies, approaching the sound speed of the pure air at high frequencies (above ~100 Hz).

Similarly, FIG. 20 shows the predicted behavior for a coal/air mixture with an air-to-fuel ratio of 1.8 with varying particle size. This figure illustrates that particle size has no influence on either the low frequency limit (quasi-steady ) sound speed, or on the high frequency limit of the sound speed. However, particle size does have a pronounced effect in the transition region.

FIGS. 19 and 20 illustrate an important aspect of the present invention. Namely, that the dispersive properties of dilute mixtures of particles suspended in a continuous fluid can be broadly classified into three frequency regimes: low frequency range, high frequency range and a transitional frequency range. Although the effect of particle size and air-to-fuel ratio are inter-related, the predominant effect of air-to-fuel ratio is to determine the low frequency limit of the sound speed to be measured and the predominate effect of particle size is to determine the frequency range of the transitional regions. As particle size increases, the frequency at which the dispersive properties appear decreases. For typical pulverized coal applications, this transitional region begins at fairly low frequencies, ~2 Hz for 50 um size particles.

Given the difficulties measuring sufficiently low frequencies to apply the quasi-steady model and recognizing that the high frequency sound speed contains no direct information on either particle size or air-to-fuel ratio, it becomes apparent that the dispersive characteristics of the coal/air mixture should be utilized to determine particle size and air-to-fuel ratio based on speed of sound measurements.

Some or all of the functions within the processing unit 224 may be implemented in software (using a microprocessor or computer) and/or firmware, or may be implemented using analog and/or digital hardware, having sufficient memory, interfaces, and capacity to perform the functions described herein.

The scope of the invention is not intended to be limited to any type or kind of processing technique, and is intended to include processing technique now known in the art, and later developed in the future.

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein without departing from the spirit and scope of the present invention.

What is claimed is:

1. A system to measure a parameter of a fluid flowing in a pipe; the system comprising:
    a sensor including a standoff for engaging the outer surface of the pipe, said standoff being actively cooled, and piezoelectric material disposed on the standoff, said piezoelectric material providing a sensor signal indicative of pressures in the pipe; and
    a processor, in response to said sensor signal, providing an output signal indicative of the parameter of the fluid.

2. The system according to claim 1, wherein the processor determines the velocity of the fluid flowing through the pipe.

3. The system according to claim 1, further includes a thermal barrier arranged between the sensor and the outer surface of the pipe.

4. The system according to claim 3, wherein the thermal barrier is formed of a low thermal conductivity material being relatively stiff in compression and flexible in bending.

5. The system according to claim 1, wherein the standoff includes a standoff ring for extending circumferentially around a portion of the pipe, the standoff ring having a cooling channel through which a cooling fluid flows.

6. The system according to claim 5, wherein the standoff ring is formed of a relatively high thermal conductivity material being stiff in compression.

7. The system according to claim 5, wherein the standoff ring is partially segmented into multiple circumferential segments.

8. The system according to claim 5, wherein further includes a pump for providing the cooling fluid that flows through the cooling channel.

9. The system according to claim 5, further includes a heat exchanger for processing the cooling fluid flowing through the cooling channel.

10. The system according to claim 5, wherein the standoff ring has partial radial slots therein.

11. The system according to claim 5, wherein the standoff ring has one or more fasteners for attaching the standoff onto the pipe.

12. The system according to claim 1, wherein the piezoelectric material is attached to a sensor band, and the band engages around the standoff.

13. The system according to claim 12, further includes a plurality of standoffs circumferentially arranged axially along the pipe for holding the sensor band spaced from the outer surface of the pipe.

14. The system according to claim 1, further includes a plurality of sensors arranged along the longitudinal axis of the pipe.

15. The system according to claim 1, further includes a plurality of sensors arranged along the longitudinal axis of the pipe.

16. The system according to claim 1, wherein the piezoelectric material is a piezoelectric film material.

17. The system according to claim 16, wherein the piezoelectric film material is a polyvinylidene fluoride.

18. The system according to claim 1, wherein the sensor is clamped onto the outer surface of the pipe.

19. The system according to claim 1, wherein the processor determines the velocity of a one-dimensional acoustic wave propagating axially through the fluid flowing through the pipe.

20. The system according to claim 1, wherein the processor determines the gas phase fraction of the fluid flowing through the pipe.

21. A system to measure a parameter of a fluid flowing in a pipe; the system comprising:
a sensor including a standoff formed of thermally insulative material for engaging the outer surface of the pipe, and piezoelectric material disposed on the standoff, said piezoelectric material providing a sensor signal indicative of pressures in the pipe; and
a processor, in response to said sensor signal, providing an output signal indicative the parameter of the fluid.

22. The system according to claim 21, wherein the standoff includes a standoff ring for extending circumferentially around a portion of the pipe, the standoff ring having relatively stiff in radial compression.

23. The system according to claim 22, wherein the standoff ring is partially segmented into multiple circumferential segments.

24. The system according to claim 22, wherein the standoff ring has partial radial slots therein.

25. The system according to claim 22, wherein the standoff ring has one or more buckles for fastening the standoff onto the pipe.

26. The system according to claim 21, wherein the piezoelectric material is attached to a sensor band, and the band engages around the standoff.

27. The system according to claim 26, wherein the standoff includes a plurality of standoffs circumferentially arranged on the pipe for holding the sensor band spaced from the outer surface of the pipe.

28. The system according to claim 21, wherein the piezoelectric material is a piezoelectric film material.

29. The system according to claim 28, wherein the piezoelectric film material is a polyvinylidene fluoride.

30. The system according to claim 21, wherein the sensor is clamped onto the outer surface of the pipe.

31. The system according to claim 21, wherein the processor determines the velocity of the fluid flowing through the pipe.

32. The system according to claim 21, wherein the processor determines the velocity of a one-dimensional acoustic wave propagating axially through the fluid flowing through the pipe.

33. The system according to claim 21, wherein the processor determines the gas phase fraction of the fluid flowing through the pipe.

34. A method to measure a parameter of a fluid flowing in a pipe; the method comprising:
disposing on the outer surface of the pipe a sensor including a standoff having piezoelectric material disposed on the standoff, said piezoelectric material providing a sensor signal indicative of pressures in the pipe;
cooling actively the sensor; and
providing an output signal indicative of the parameter of the fluid in response to said sensor signal.

35. The method according to claim 34, wherein the providing an output signal includes determining the velocity of a fluid flowing though the pipe.

36. The method according to claim 34, further including pumping a cooling fluid though a cooling channel in thermal communication with the standoff.

37. The method according to claim 34, wherein the providing an output signal includes determining the velocity of a one-dimensional acoustic wave propagating axially through the fluid flowing through the pipe.

38. The method according to claim 34, wherein the providing an output signal includes determining the gas phase fraction of the fluid flowing through the pipe.

39. A sensor to measure pressures in a pipe; the sensor comprising:
a standoff including a standoff for engaging the outer surface of the pipe, said standoff being actively cooled; and
piezoelectric material disposed on said standoff, said piezoelectric material providing a sensor signal indicative of pressures in the pipe.

40. The sensor according to claim 39, further includes a thermal baffler arranged between the sensor and the outer surface of the pipe.

41. The sensor according to claim 40, wherein the thermal barrier is formed of a low thermal conductivity material being relatively stiff in compression and flexible in bending.

42. The sensor according to claim 39, wherein the standoff includes a standoff ring for extending circumferentially around a portion of the pipe, the standoff ring having a cooling channel though which a cooling fluid flows.

43. The sensor according to claim 42, wherein the standoff ring is formed of a relatively high thermal conductivity material being stiff in compression.

44. The sensor according to claim 42, wherein the standoff ring is partially segmented into multiple circumferential segments.

45. The sensor according to claim 42, wherein further includes a pump for providing the cooling fluid that flows through the cooling channel.

46. The sensor according to claim 42, further includes a heat exchanger for processing the cooling fluid flowing through the cooling channel.

47. The sensor according to claim 42, wherein the standoff ring has partial radial slots therein.

48. The sensor according to claim 42, wherein the standoff ring has one or more fasteners for attaching the standoff onto the pipe.

49. The sensor according to claim 39, wherein the piezoelectric material is attached to a sensor band, and the band engages around the standoff.

50. The sensor according to claim 39, wherein the piezo electric material is a piezoelectric film material.

51. The sensor according to claim 50, wherein the piezoelectric film material is a polyvinylidene fluoride.

52. The sensor according to claim 39, wherein the sensor is clamped onto the outer surface of the pipe.

53. A sensor to measure pressures in a pipe; the sensor comprising:
   a standoff formed of thermally insulative material for engaging the outer surface of the pipe; and
   piezoelectric material disposed on said standoff, said piezoelectric material providing a sensor signal indicative of pressures in the pipe.

54. The sensor according to claim 53, wherein the standoff includes a standoff ring that is a relatively stiff in radial compression.

55. The sensor according to claim 54, wherein the standoff ring is partially segmented into multiple circumferential segments.

56. The sensor according to claim 54, wherein the standoff ring has partial radial slots therein.

57. The sensor according to claim 54, wherein the standoff ring has one or more fasteners for attaching the standoff onto the pipe.

58. The sensor according to claim 53, wherein the piezoelectric material is attached to a sensor head, and the band engages around the standoff.

59. The sensor according to claim 53, wherein the standoff includes a plurality of standoffs circumferentially arranged on the pipe for holding the sensor band spaced from the outer surface of the pipe.

60. The sensor according to claim 53, wherein the piezoelectric material is a piezoelectric film material.

61. The sensor according to claim 60, wherein the piezoelectric film material is a polyvinylidene fluoride.

62. The sensor according to claim 53, wherein the sensor is clamped onto the outer surface of the pipe.

* * * * *